United States Patent
Kameyama et al.

[11] Patent Number: 6,140,792
[45] Date of Patent: Oct. 31, 2000

[54] MOTOR DRIVE CONTROL APPARATUS AND METHOD, AND IMAGE FORMING APPARATUS USING THE METHOD

[75] Inventors: Shigeru Kameyama, Numazu; Hakaru Muto, Yokohama, both of Japan

[73] Assignee: Canon Kabushiki Kaisha, Tokyo, Japan

[21] Appl. No.: 09/024,862

[22] Filed: Feb. 17, 1998

[30] Foreign Application Priority Data

| Feb. 17, 1997 | [JP] | Japan | 9-032127 |
| Apr. 11, 1997 | [JP] | Japan | 9-110318 |
| Jul. 7, 1997 | [JP] | Japan | 9-196542 |

[51] Int. Cl.[7] .................................................. G05B 5/01

[52] U.S. Cl. ...................... 318/685; 318/448; 318/611; 318/702

[58] Field of Search ............................... 318/685, 696, 318/254, 701, 702, 448, 611

[56] References Cited

U.S. PATENT DOCUMENTS

| 4,330,739 | 5/1982  | Chiang          | 318/696 |
| 4,520,302 | 5/1985  | Hill et al.     | 318/696 |
| 4,626,754 | 12/1986 | Habermann et al.| 318/460 |
| 5,243,327 | 9/1993  | Bentz et al.    | 340/566 |
| 5,485,070 | 1/1996  | Tominaga        | 318/696 |
| 5,592,261 | 1/1997  | Yoshino         | 399/167 |
| 5,739,661 | 4/1998  | Wakuda          | 318/685 |

Primary Examiner—Bentsu Ro
Attorney, Agent, or Firm—Fitzpatrick, Cella, Harper & Scinto

[57] ABSTRACT

The invention detects vibrations of a motor by a vibration detection means, compares the detected vibration detection value with a reference value using control means, and changes the voltage to be applied to each of coils of the respective excitation phases until the vibration detection value reaches the reference value, thereby controlling the excitation currents that flow through the coils of the respective excitation phases to reduce the vibrations of the motor.

11 Claims, 20 Drawing Sheets

FIG. 4
OUTPUT EXAMPLE OF PIEZOELECTRIC ELEMENT
CURRENT = SMALL
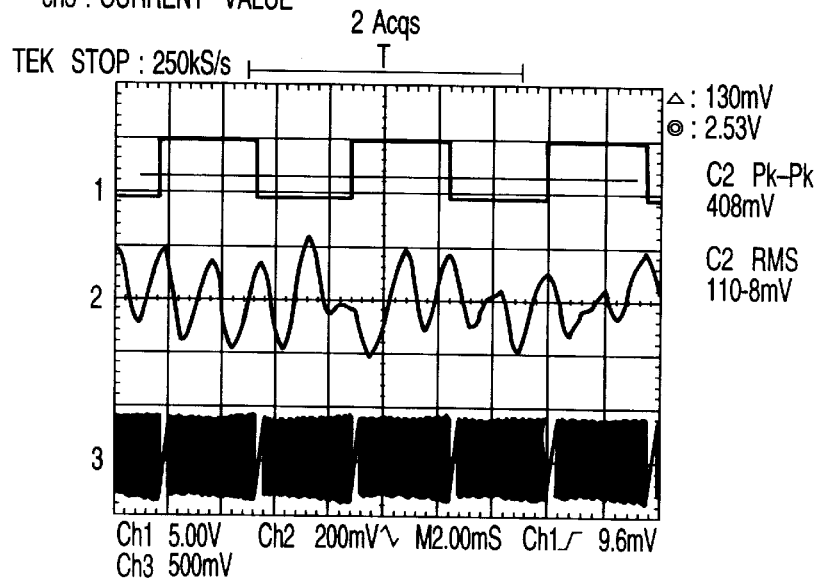
OUTPUT EXAMPLE OF PIEZOELECTRIC ELEMENT
CURRENT VALUE = LARGE
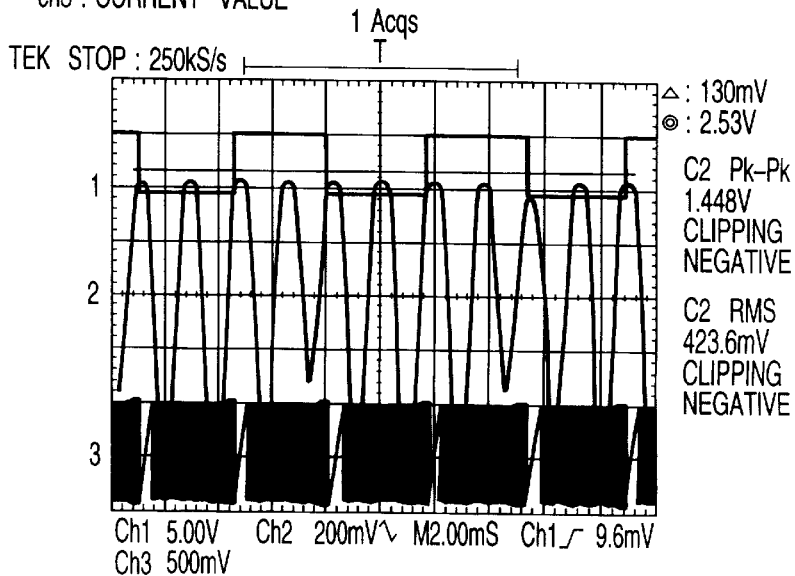

OUTPUT EXAMPLE OF
PIEZOELECTRIC ELEMENT

PROPER VALUE

OUTPUT EXAMPLE OF PIEZOELECTRIC ELEMENT (VIBRATION = LARGE)

OUTPUT EXAMPLE OF PIEZOELECTRIC ELEMENT (VIBRATION = SMALL)

OUTPUT EXAMPLE OF DETECTION RESISTOR
NORMAL ROTATION

OUTPUT EXAMPLE OF DETECTION RESISTOR
STEPPING OUT

MOTOR DRIVE CONTROL APPARATUS AND METHOD, AND IMAGE FORMING APPARATUS USING THE METHOD

BACKGROUND OF THE INVENTION

1. Field of the Invention

The present invention relates to a drive control apparatus and method for a motor such as a stepping motor, rotation of which is controlled by switching the excitation phases in turn, and an image forming apparatus using the method.

2. Description of the Related Art

An electrophotographic image forming apparatus will be exemplified below as a prior art that relates to motor drive control. In FIG. 22, each of paper sheets 10 stocked on a paper feed tray 9 is fed into the apparatus by a paper feed portion 11. The leading end of the fed paper sheet is gripped by a gripper 12, and the paper sheet is held on the outer surface of a transfer drum 13. On the other hand, an electrostatic latent image formed in units of colors on a photosensitive drum 14 by an optical unit 15 is developed by a corresponding one of color developers 16 to 19, and is transferred onto the paper sheet 10. The paper sheet 10 is separated from the transfer drum 13, and images formed thereon are fixed by a fixing unit 20. The paper sheet 10, the images on which have been fixed, is discharged onto a discharge tray 37 by a discharge portion 21. The photosensitive drum 14 is cleaned by a cleaning unit 22 to prepare for the next development.

In such apparatus, the paper feed portion 11, transfer drum 13, and the like comprise stepping motors for driving. A drive IC used for driving such stepping motor has ports for setting the current values to be supplied to the individual coils in units of excitation phases, and the excitation current value is determined depending on the voltages to be applied to these excitation phases. Conventionally, motor drive control is done by applying predetermined constant voltages to the respective ports.

However, the above prior art poses the following problems since constant voltages are applied to the current value setting ports of the individual phases.

The excitation current is always constant independently of the load. That is, in order to drive a heavier load, the current must be re-set. On the other hand, when the load is small, unwanted vibrations are produced, and consumption power is wasted due to an excessive torque.

In order to obtain smooth rotation, the individual coils must produce identical torques. However, even when identical voltages are applied to the ports, the individual coils produce different torques due to errors of the coils themselves and the drive IC itself. Hence, torque variations produce unwanted vibrations.

In particular, in a color printer which is demanded to reproduce a halftone image, such torque variations cause banding and color nonuniformity.

Also, in the above prior art, since the stepping motor is controlled by an open loop, the following problem is posed. For example, even when the motor steps out due to, e.g., an excessive load, such errors cannot be detected. Therefore, machine operation hangs up there unless rotation abnormality is detected by an extra sensor or the like. In this case, a current larger than that flows in normal rotation flows, and makes the motor and motor drive generate heat. In the worst case, they may catch fire or produce smoke. Even when abnormality has been detected using an extra sensor or the like, whether the abnormality is caused by a motor failure or sensor failure cannot be detected.

SUMMARY OF THE INVENTION

The present invention has been made in consideration of the above situation, and has as its object to efficiently drive a motor without producing any excessive torque.

It is another object of the present invention to prevent vibrations by reducing the torque difference between the coils of a stepping motor.

It is still another object of the present invention to detect the stepping out of motor operation.

Other objects of the present invention will become apparent from the following detailed description of the embodiments.

BRIEF DESCRIPTION OF THE DRAWINGS

FIG. 4 is a chart showing the output from a piezoelectric element in the motor drive control circuit shown in FIG. 2 when the current is small;

DESCRIPTION OF THE PREFERRED EMBODIMENTS

The preferred embodiments of the present invention will be described hereinafter with reference to the accompanying drawings. Prior to the description, an image forming apparatus according to the present invention will be explained with the aid of FIG. 1.

Figure 1:
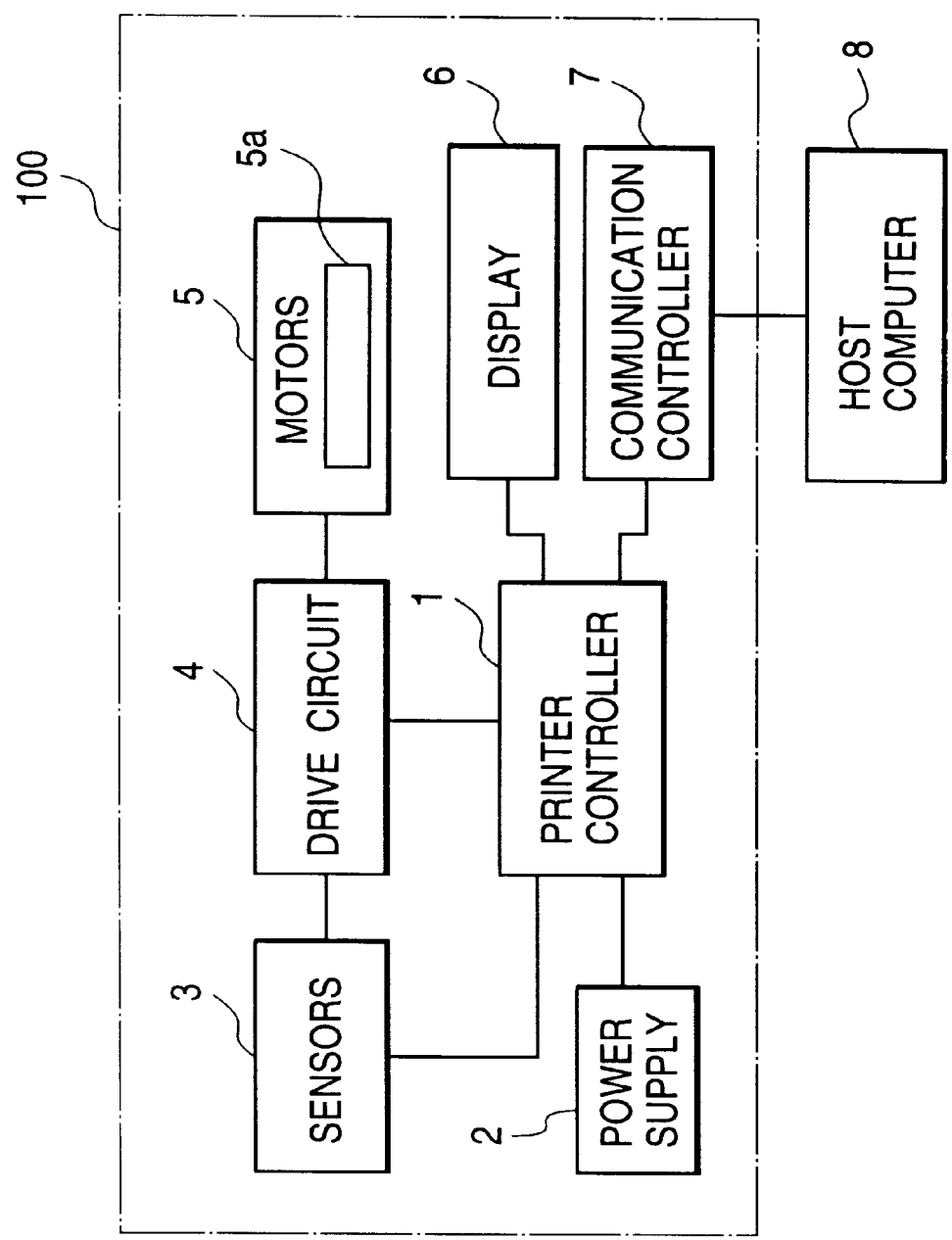
FIG. 1 is a block diagram of an image forming apparatus according to the present invention.

In FIG. 1, a printer controller 1 controls the respective devices in a printer 100. A power supply 2 supplies electric power to the respective devices in the printer 100. Sensors 3 detect the states of the respective units in the printer 100. A drive circuit 4 drives motors 5 in accordance with an instruction from the printer controller 1. The motors 5 serve as power sources of the individual devices in the printer 100. The motors 5 include stepping motors 5a for driving, e.g., a paper feed portion, transfer drum, and the like. Note that the motor is not limited to the stepping motor 5a, but may be any other motors as long as their rotation is controlled by switching the excitation phases in turn.

A display 6 informs the user of the operation state of the printer 100. A communication controller 7 performs communications between the printer 100 and a host computer 8. The host computer 8 sends the data to be printed to the printer 100.

First Embodiment

The first embodiment of the present invention will be explained below with reference to FIGS. 2 to 5.

Figure 2:
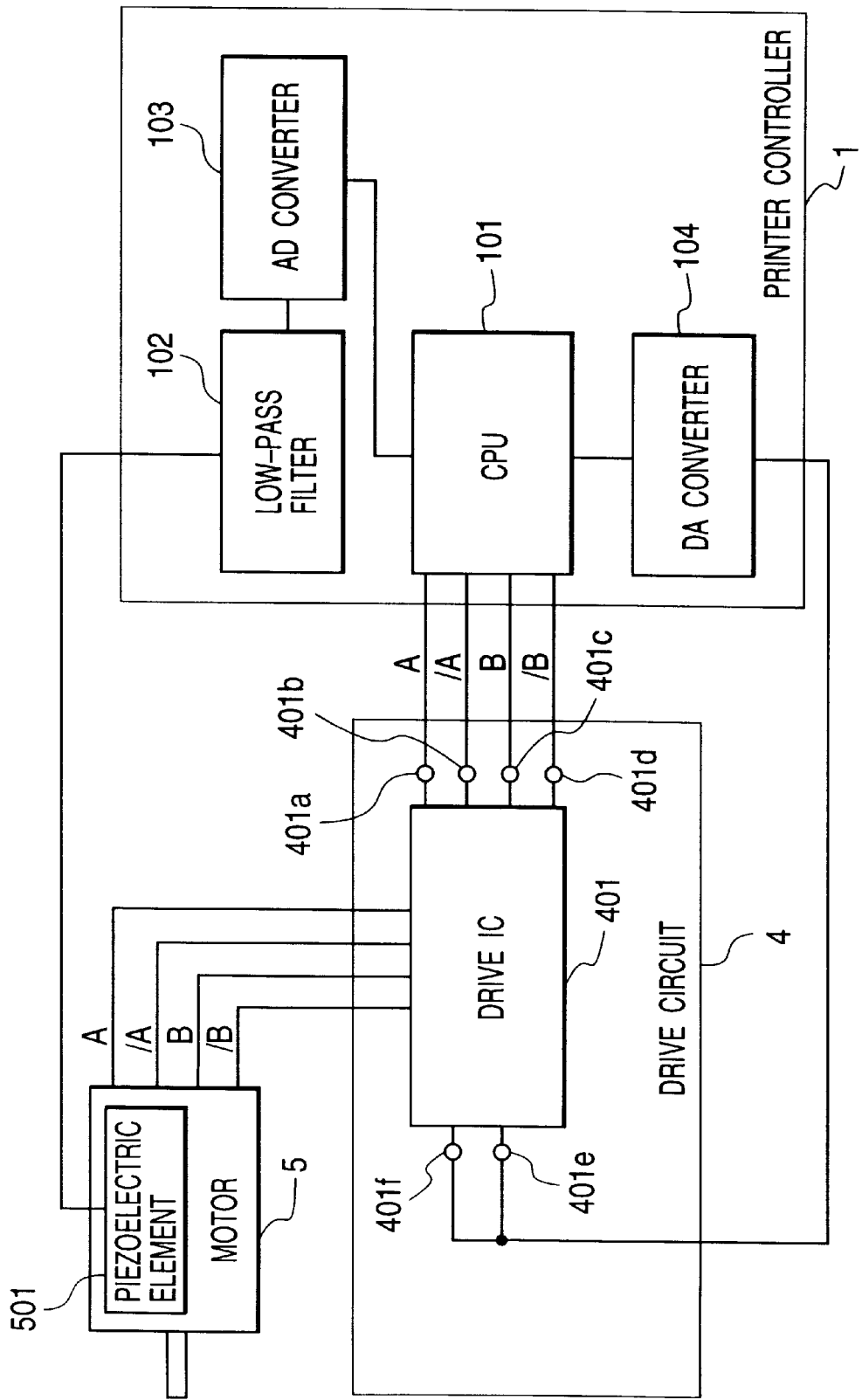
FIG. 2 is a circuit diagram of a drive control circuit for a motor shown in FIG. 1 according to the first embodiment of the present invention.
Figure 5:
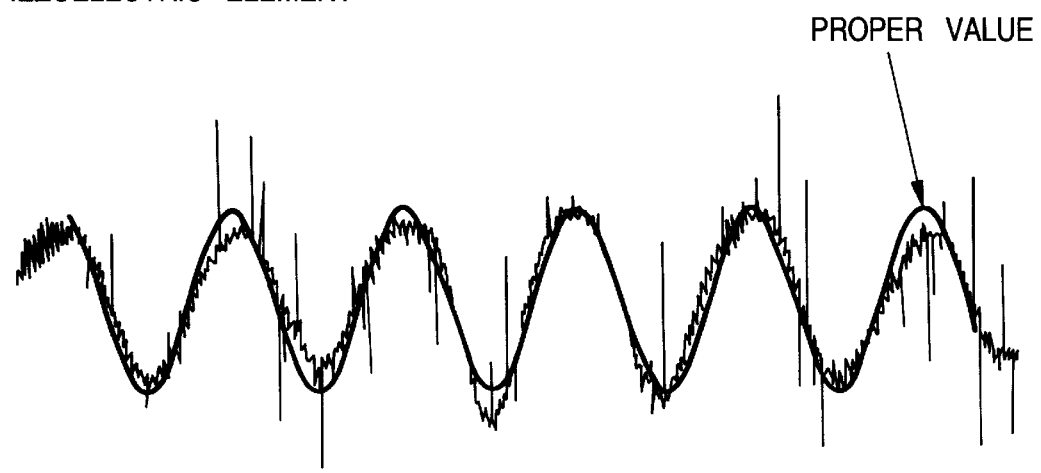
FIG. 5 is a chart showing the output from the piezoelectric element in the motor drive control circuit shown in FIG. 2 when the current is large.

FIG. 2 shows a motor drive control circuit according to the first embodiment of the image forming apparatus shown in FIG. 1. In FIG. 2, the printer controller 1 comprises a CPU 101, low-pass filter 102, AD converter 103, and DA converter 104. The drive circuit 4 comprises a stepping motor drive IC 401 which has excitation signal input terminals 401a to 401d for ON/OFF-controlling the currents to be supplied to A and /A phases, and B and /B phases. These terminals 401a to 401d are connected to ports of the CPU 101. The drive IC 401 also has current value setting terminals 401e and 401f for setting the values of currents to be supplied to A and /A phases, and to B and /B phases. These terminals 401e and 401f are connected to the DA converter 104. A piezoelectric element 501 is attached to, e.g., a motor case of each motor 5, and its output has a cycle and amplitude corresponding to motor vibrations, as shown in FIG. 4. Also, the output from the piezoelectric element 501 changes depending on the current value. In other words, different torques in units of excitation phases result in uneven rotation, and produce vibrations. Hence, the drive currents are controlled in units of excitation phases, so that the amplitude of that output assumes a proper value, as shown in FIG. 5.

The output from the piezoelectric element is supplied to the low-pass filter 102 to remove noise, and the output from the filter 102 is converted into a digital value by the AD converter 103. The digital value is supplied to the CPU 101.

The stepping motor drive IC normally uses the one that switches the excitation phases in accordance with an input signal, and controls the currents on the basis of the voltages input to its current value setting ports. The stepping motor is driven by inputting a predetermined pattern signal to the stepping motor drive IC. Note that the drive ICs are arranged in correspondence with the individual motors. However, when there are more than one motors that are not simultaneously driven, the output from a single drive IC may be switched and used.

Upon reception of a drive start instruction of the stepping motor, the CPU applies voltages set as initial values to the current value setting ports. Subsequently, the CPU outputs data having a predetermined pattern to the excitation signal input terminals of the drive IC. The drive IC switches the excitation phases on the basis of the input data, and controls the current to obtain the set current value.

There are four combinations of phases to be excited, which are repetitively excited in turn. In this cases, the combinations of phases repeat like AB, B/A, /A/B, /BA, AB, B/A, . . . . The CPU measures the output from the piezoelectric element adhered to the motor in units of excitation phases, and calculates average values a1, a2, a3, and a4 of n past outputs in units of combinations of excitation phases. Also, the CPU stores an output a0 (corresponding to a desired drive current value) of the piezoelectric element in proper driving. The output from the piezoelectric element has different amplitudes in units of excitation phases, as shown in FIG. 4. Also, the output changes depending on the current value. In other words, different torques in units of excitation phases result in uneven rotation, and produce vibrations. Hence, the drive currents are controlled in units of excitation phases, so that the amplitude of that output assumes a proper value, as shown in FIG. 5.

Figure 3:
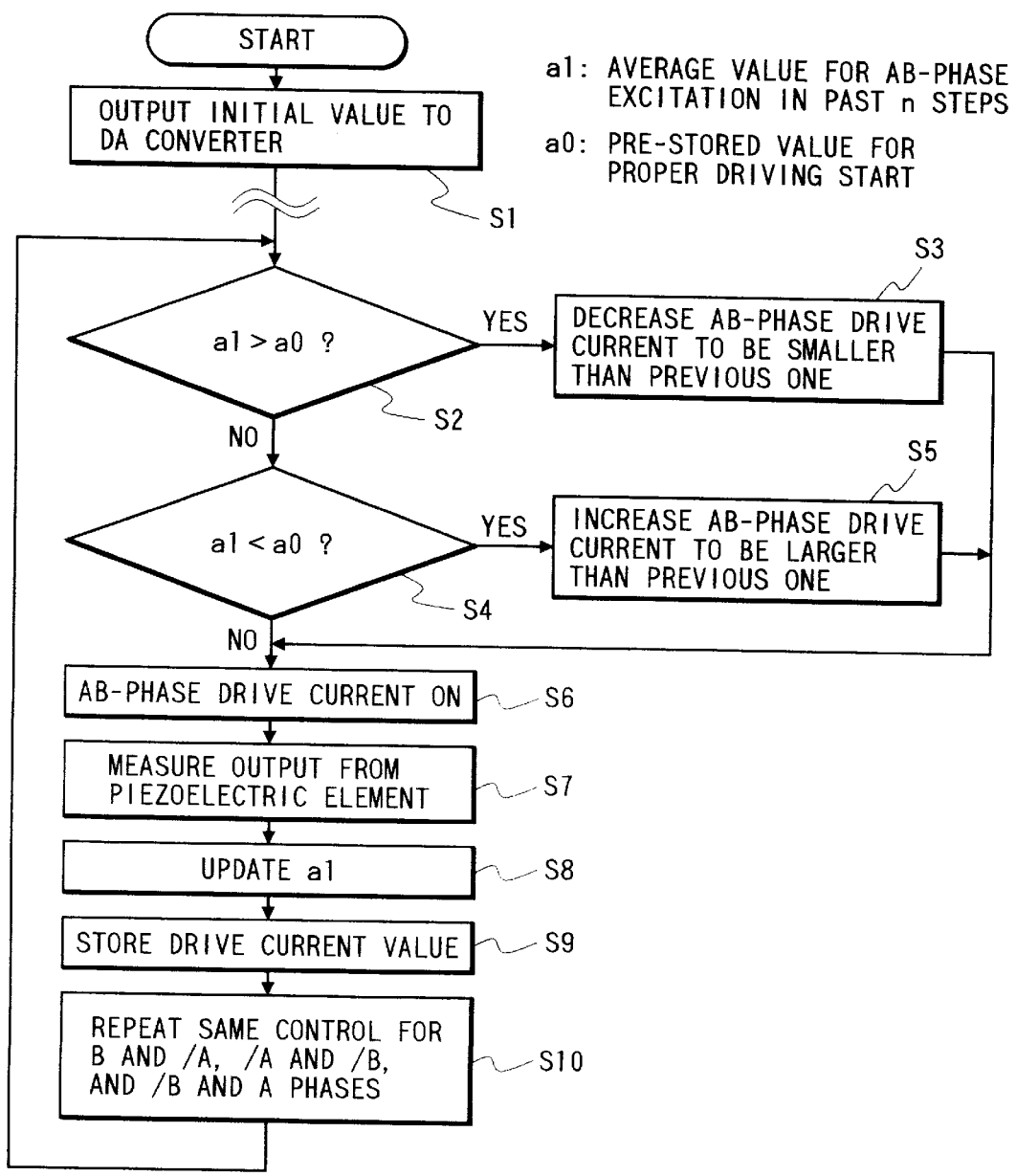
FIG. 3 is a flow chart of the motor drive control circuit shown in FIG. 2.

The operation will be explained below with reference to the flow chart in FIG. 3. Note that the flow chart shows only steps particularly associated with the present invention, and does not show any non-associated steps.

First, an initial value is output to the DA converter 104 to set the current values to be supplied to the A and /A phases, and B and /B phases at the current value setting terminals 401e and 401f (step S1).

When the A and B phases are to be excited, the average value a1 of n past outputs from the piezoelectric element upon exciting the A and B phases is compared with the output a0 from the piezoelectric element in proper driving so as to check if a1 is larger than a0 (step S2).

If it is determined in step S2 that a1 is larger than a0, the AB-phase drive current is decreased to be smaller than the previous one (step S3).

If it is determined in step S2 that a1 is not larger than a0, it is checked if a1 is smaller than a0 (step S4).

If it is determined in step S4 that a1 is smaller than a0, the AB-phase drive current is increased to be larger than the previous one (step S5).

The AB-phase drive current, which is decreased in step S3, increased in step S5, or remains the same, is supplied to the A and B phases (step S6).

The output from the piezoelectric element at that time is measured to obtain the latest output value for calculating the average value a1 (step S7).

Subsequently, a1 is updated to be used in step S2 or S4 in the next loop (step S8). That is, the oldest output value is discarded, and the average value is calculated by adding the latest output value obtained in step S7.

Finally, the AB-phase drive current supplied to the A and B phases in step S6 is stored to be used in step S3 or S5 in the next loop (step S9).

The same control is repeated for the B and /A, /A and /B, and /B and A phases (step S10). By repeating the above steps for the individual excitation phases, the average values a1 to a4 converge to the output a0 from the piezoelectric element in proper driving. In other words, the AB-, B/A-, /A/B-, and /BA-phase drive current values converge to a single, desired, proper drive current value, and after the convergence, the motor can be driven by the single, desired, proper drive current value without changing the current value.

Second Embodiment

The second embodiment of the present invention will be described below with reference to FIGS. 6 and 7.

Figure 6:
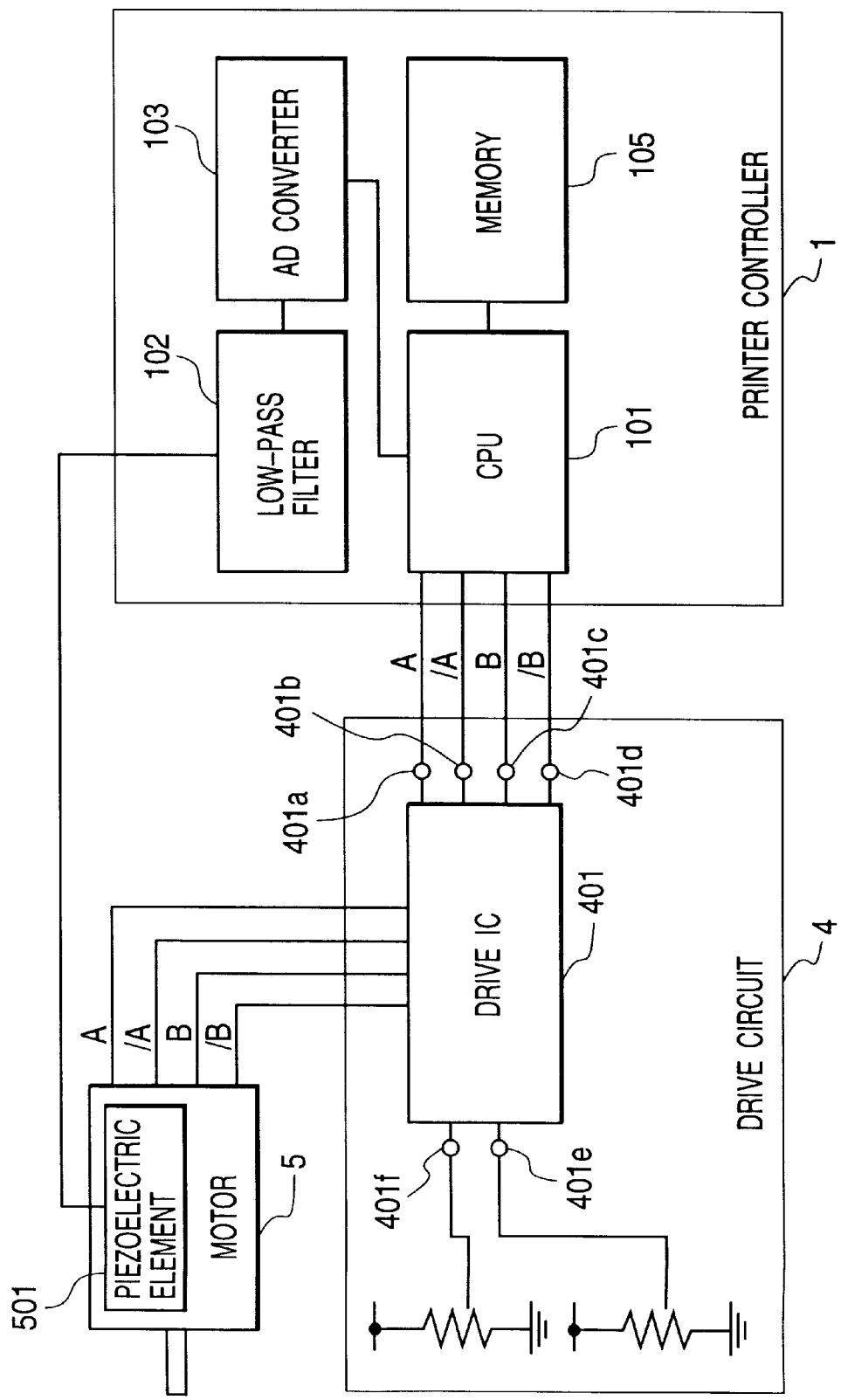
FIG. 6 is a circuit diagram of a drive control circuit for the motor shown in FIG. 1 according to the second embodiment of the present invention.
Figure 7:
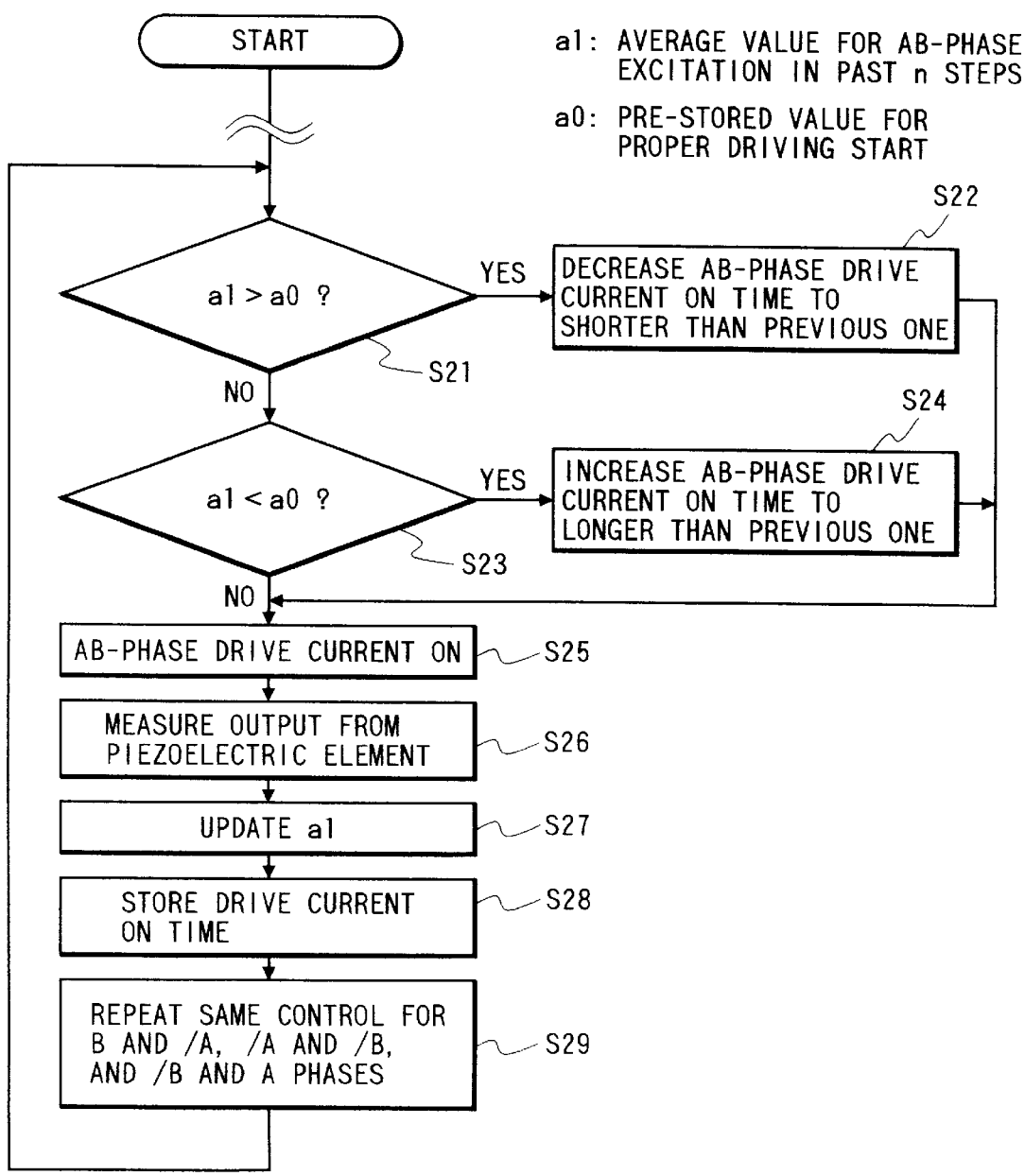
FIG. 7 is a flow chart of the motor drive control circuit shown in FIG. 6.

FIG. 6 shows a motor drive control circuit according to the second embodiment of the image forming apparatus shown in FIG. 1. In FIG. 6, the printer controller 1 comprises a CPU 101, low-pass filter 102, AD converter 103, DA converter 104, and memory 105. The drive circuit 4 comprises a stepping motor drive IC 401, which has excitation signal input terminals 401a to 401d for ON/OFF-controlling the currents to be supplied to A and /A phases, and B and /B phases. These terminals 401a to 401d are connected to ports of the CPU 101. The drive IC 401 also has current value setting terminals 401e and 401f for setting the values of currents to be supplied to A and /A phases, and to B and /B phases. These terminals 401e and 401f are connected to voltage-dividing resistors. A piezoelectric element 501 is attached to each motor 5. The output from the piezoelectric element is supplied to the low-pass filter 102 to remove noise, and the output from the filter 102 is converted into a digital value by the AD converter 103. The digital value is supplied to the CPU 101. The operation of the drive IC is the same as that in the first embodiment.

Upon reception of a drive start instruction of the stepping motor, data having a predetermined pattern is output to the excitation signal input terminals of the drive IC. This data is kept output during motor driving, although not shown. The drive IC switches the excitation phases based on that data, and controls the current to obtain the set current value.

There are four combinations of phases to be excited, which are repetitively excited in turn. In this cases, the combinations of phases repeat like AB, B/A, /A/B, /BA, AB, B/A, . . . . The CPU measures the output from the piezoelectric element adhered to the motor in units of excitation phases, and calculates average values a1, a2, a3, and a4 of n past outputs in units of combinations of excitation phases. Also, the CPU stores an output a0 (corresponding to a desired drive current value) of the piezoelectric element in proper driving. The output from the piezoelectric element has different amplitudes in units of excitation phases, as shown in FIG. 4. Also, the output changes depending on the current value. In other words, different torques in units of excitation phases result in uneven rotation, and produce vibrations. Hence, the drive currents are controlled in units of excitation phases, so that the amplitude of that output assumes a proper value.

The operation will be explained below with reference to the flow chart in FIG. 7. Note that the flow chart shows only steps particularly associated with the present invention, and does not show any non-associated steps.

When the A and B phases are to be excited, the average value a1 of n past outputs from the piezoelectric element upon exciting the A and B phases is compared with the output a0 from the piezoelectric element in proper driving so as to check if a1 is larger than a0 (step S21).

If it is determined in step S21 that a1 is larger than a0, the AB-phase drive current ON time is set to be shorter than the previous one (step S22).

If it is determined in step S21 that a1 is not larger than a0, it is checked if a1 is smaller than a0 (step S23).

If it is determined in step S23 that a1 is smaller than a0, the AB-phase drive current ON time is set to be longer than the previous one (step S24).

The drive current is supplied to the A and B phases for the AB-phase drive current ON time, which is shortened in step S22, prolonged in step S24, or remains the same (step S25).

The output from the piezoelectric element at that time is measured to obtain the latest output value for calculating the average value a1 (step S26).

Subsequently, a1 is updated to be used in step S21 or S23 in the next loop (step S27). That is, the oldest output value is discarded, and the average value is calculated by adding the latest output value obtained in step S26.

The ON time of the AB-phase drive current supplied to the A and B phases in step S25 is stored to be used in step S22 or S24 in the next loop (step S28).

The same control is repeated for the B and /A, /A and /B, and /B and A phases (step S29). By repeating the above steps for the individual excitation phases, the average values a1 to a4 converge to the output a0 from the piezoelectric element in proper driving. In other words, the AB-, B/A-, /A/B-, and /BA-phase drive current values converge to a single, desired, proper drive current value, and after the convergence, the motor can be driven by the single, desired, proper drive current value without changing the current value.

As described above, according to the first and second embodiments of the present invention, since smooth rotation can be obtained by preventing vibrations by removing the torque differences between the coils of each stepping motor used in the image forming apparatus, an image forming apparatus which can satisfactorily form an image free from any color nonuniformity or the like can be obtained. Also a stepping motor control method that can prevent vibrations can be obtained.

Third Embodiment

The third embodiment of the present invention will be described below with reference to FIGS. 8 to 11.

Figure 8:
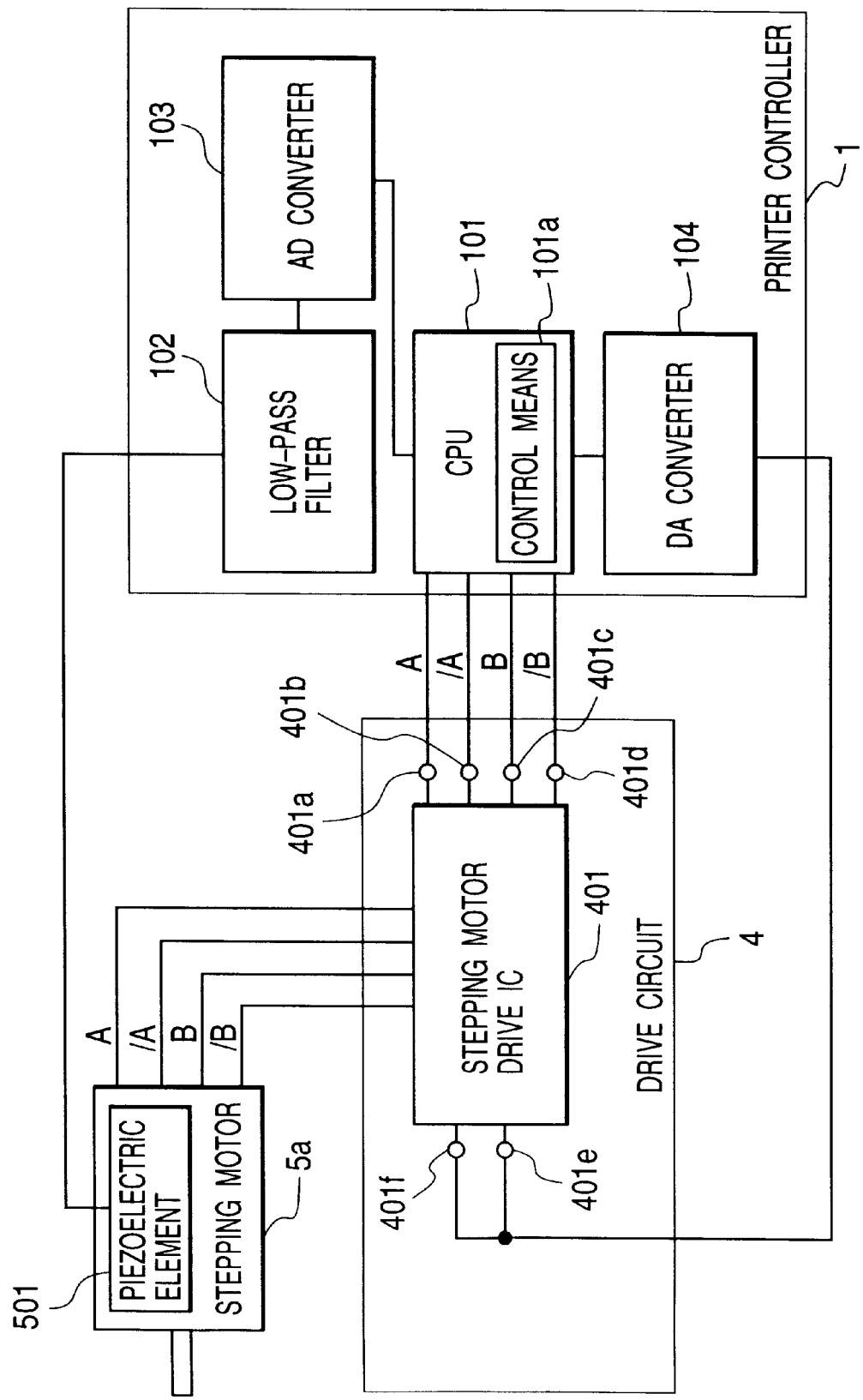
FIG. 8 is a circuit diagram of a drive control circuit for the motor shown in FIG. 1 according to the third embodiment of the present invention.
Figure 9:
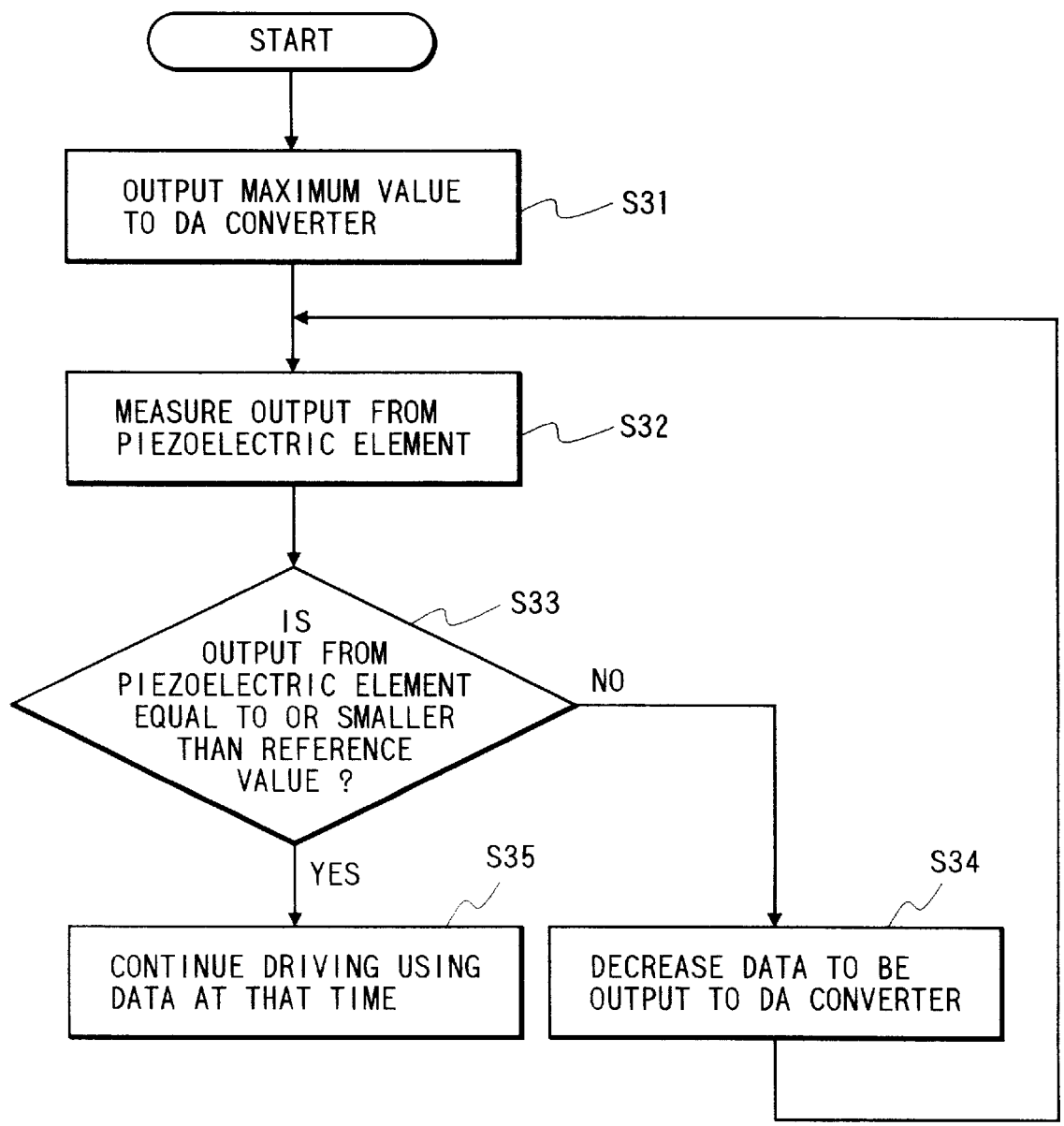
FIG. 9 is a flow chart of the motor drive control circuit shown in FIG. 8.

FIG. 8 shows a motor drive control circuit according to the third embodiment of the image forming apparatus shown in FIG. 1. Referring to FIG. 8, the printer controller 1 comprises a CPU 101 having a control means 101a for performing processing as shown in FIG. 9 (to be described later). The printer controller 1 also comprises a low-pass filter 102, AD converter 103, and DA converter 104. The drive circuit 4 comprises a stepping motor drive IC 401 which has excitation signal input terminals 401a to 401d for ON/OFF-controlling currents to be supplied to A and /A phases, and B and /B phases. These terminals 401a to 401d are connected to ports of the CPU 101. The drive IC 401 also has current value setting terminals 401e and 401f for setting the values of currents to be supplied to A and /A phases, and to B and /B phases. These terminals 401e and 401f are connected to the DA converter 104.

Figure 10:
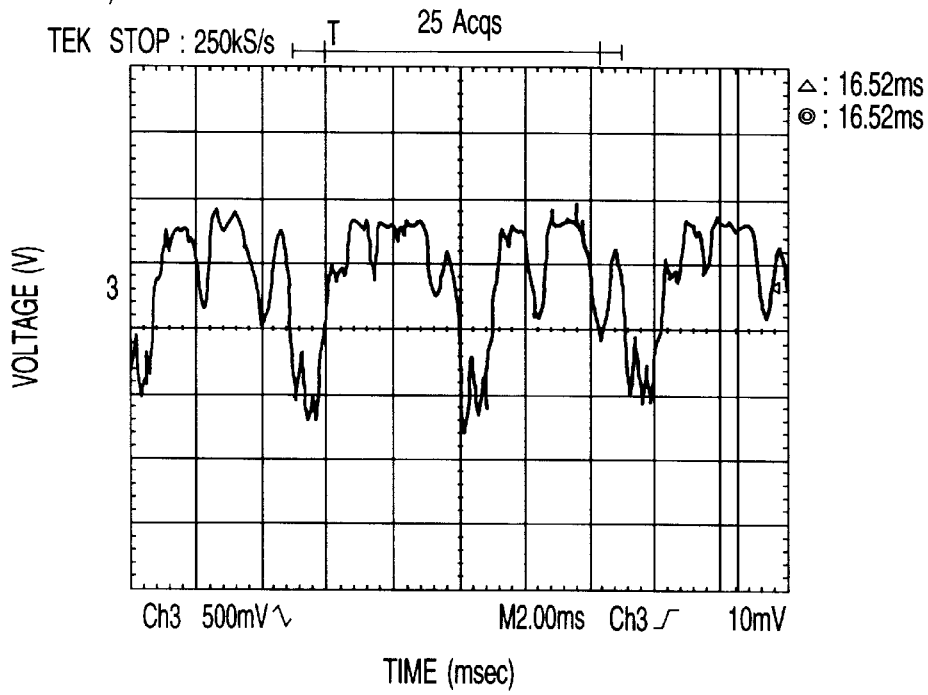
FIG. 10 is a chart showing the output from a piezoelectric element in the motor drive control circuit shown in FIG. 8 when vibrations are large.
Figure 11:
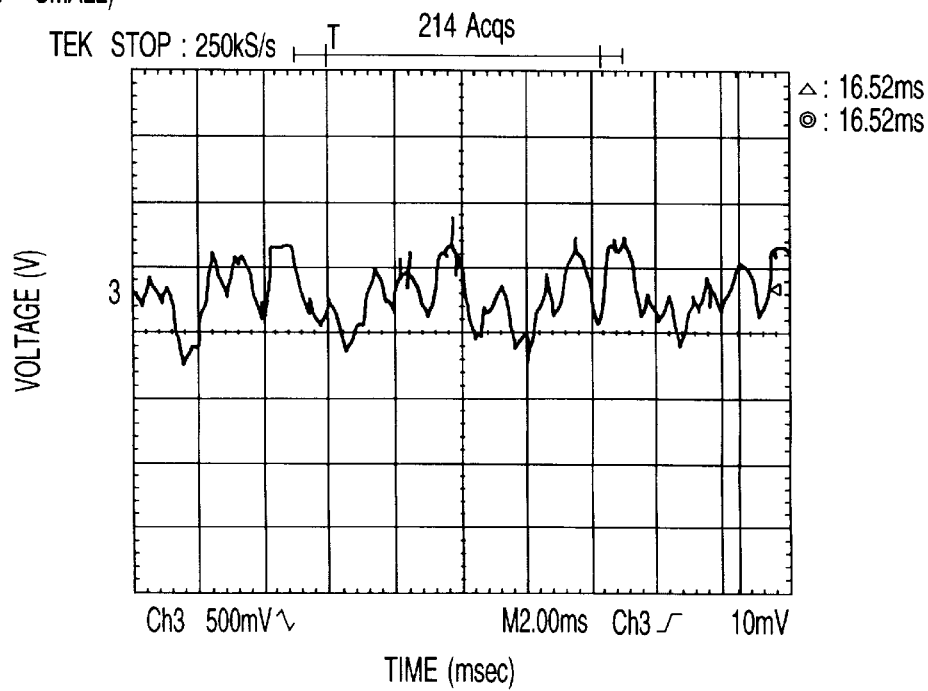
FIG. 11 is a chart showing the output from the piezoelectric element in the motor drive control circuit shown in FIG. 8 when vibrations are small.

A piezoelectric element 501 is attached to each motor 5. The output from this piezoelectric element 501 has a cycle and amplitude corresponding to motor vibrations, as shown in FIGS. 10 and 11. After the output from the piezoelectric element 501 is smoothed by the low-pass filter 102, the output is converted into a digital value by the AD converter 103, and the digital value is supplied to the CPU 101.

The stepping motor drive IC 401 normally uses the one that switches the excitation phases in accordance with an input signal, and controls the currents on the basis of voltages input to its current value setting ports 401e and 401f. In this embodiment, the stepping motor 5a is driven by inputting a predetermined pattern signal to the stepping motor drive IC 401.

Note that the drive ICs are arranged in correspondence with the individual motors. However, when there are more than one motors that are not simultaneously driven, the output from a single drive IC may be switched and used.

The operation will be explained below with reference to the flow chart in FIG. 9.

Upon reception of a drive start instruction of the stepping motor 5*a*, the CPU 101 applies voltages to the current value setting terminals 401*f* and 401*e* to set an upper limit current value (step S31). The CPU 101 then outputs data having a predetermined pattern to the excitation signal input terminals 401*a* to 401*d* of the stepping motor drive IC 401. This data is kept output during driving of the motor although not shown in FIG. 9. The stepping motor drive IC 401 switches the excitation phases on the basis of the input data, and controls the current to obtain the set current value.

Next, the CPU 101 measures the output from the piezoelectric element 501 adhered to the stepping motor 5*a* (step S32), and checks if the measured output is equal to or smaller than a pre-stored reference value (the output obtained upon driving the motor with a proper torque) (step S33). As a result of comparison, if it is determined that the measured output is larger than the reference value, the CPU decreases the voltages to be applied to the current value setting terminals 401*e* and 401*f* (step S34), and performs the measurement and comparison of the output from the piezoelectric element 501 again. The CPU repeats such operations until the output from the piezoelectric element 501 becomes equal to or lower than the reference value. When the output from the piezoelectric element 501 has become equal to or lower than the reference value, the CPU keeps driving the motor with the voltages at that time (step S35).

As described above, vibrations produced in the motor are detected using the piezoelectric element 501 equipped on the stepping motor 5*a*, and the excitation currents are controlled based on the vibration measurement result until the reference value is reached, thus preventing an excessive torque from being produced, and efficiently driving the motor.

In this embodiment, control is done by decreasing the output from the maximum output until the output becomes equal to or lower than the reference value. However, the present invention is not limited to the maximum output, and control for increasing the output may be used.

Fourth Embodiment

The fourth embodiment of the present invention will be described below with reference to FIGS. 12 and 13.

Figure 12:
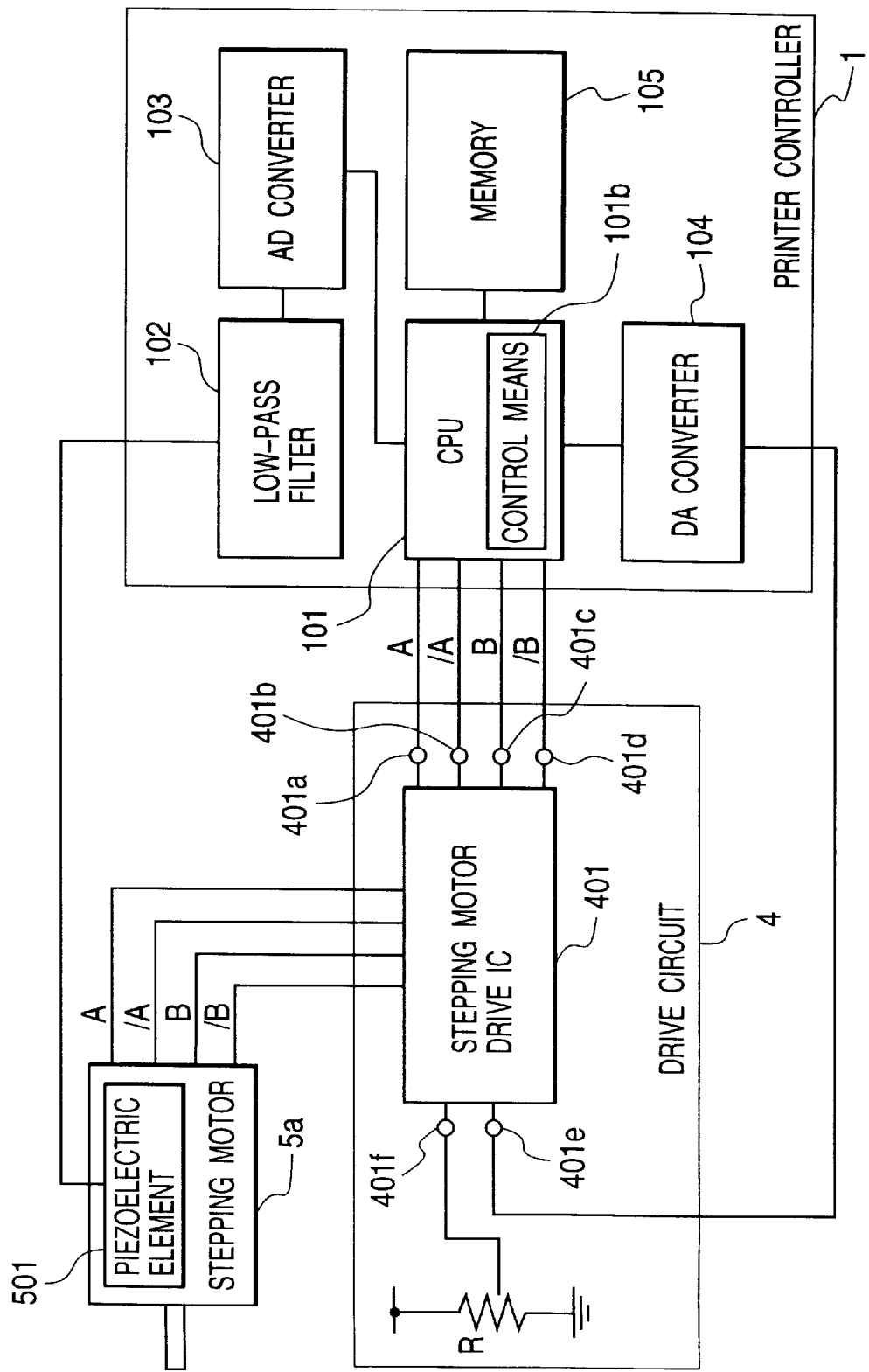
FIG. 12 is a circuit diagram of a drive control circuit for the motor shown in FIG. 1 according to the fourth embodiment of the present invention.
Figure 13:
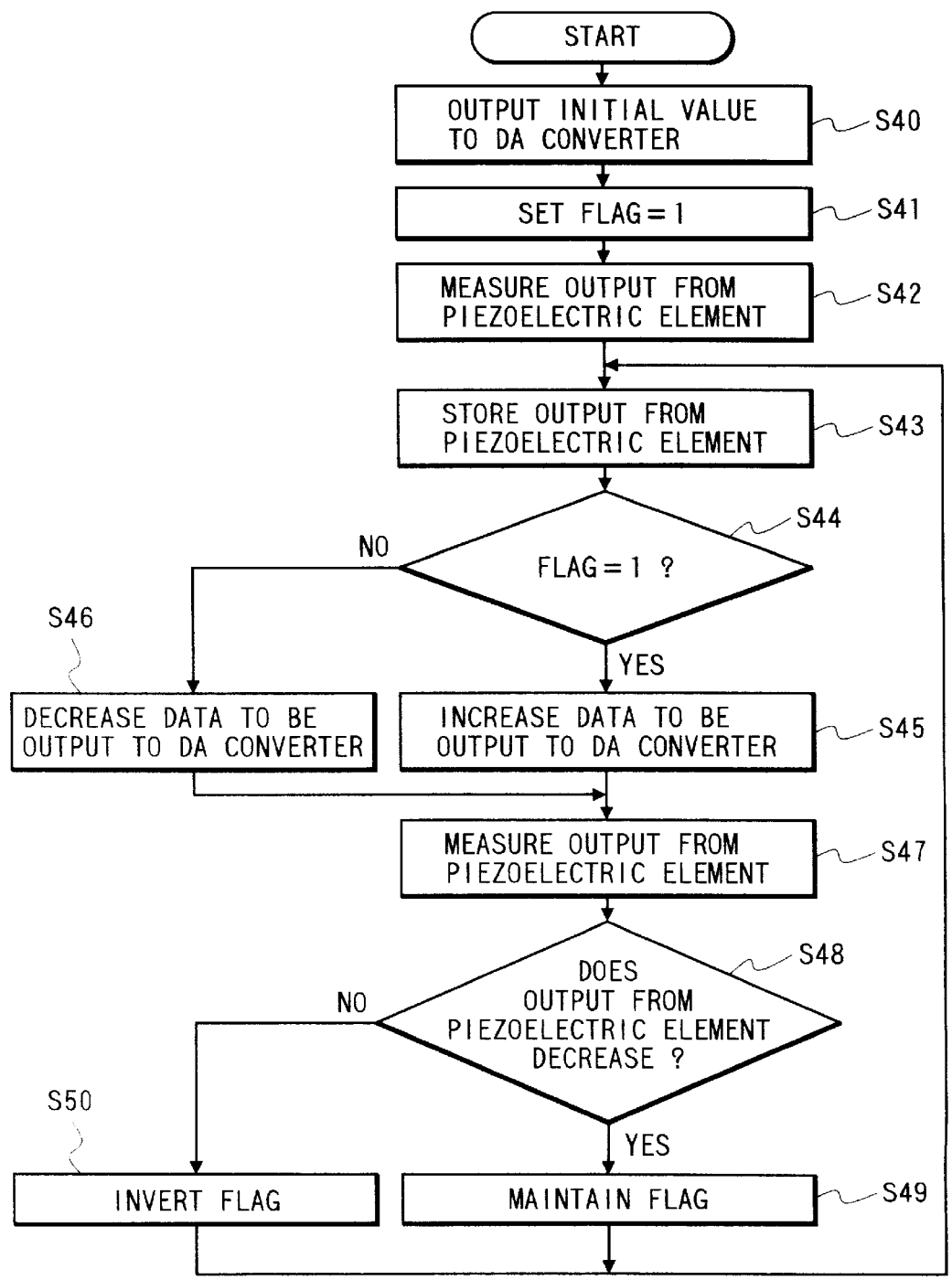
FIG. 13 is a flow chart of the motor drive control circuit shown in FIG. 12.

FIG. 12 shows a motor drive control circuit according to the fourth embodiment of the image forming apparatus shown in FIG. 1. Referring to FIG. 12, the printer controller 1 comprises a CPU 101 having a control means 101*b* for performing processing as shown in FIG. 13 (to be described later). The printer controller 1 also comprises a low-pass filter 102, AD converter 103, DA converter 104, and memory 105. The memory 105 stores the vibration measurement result data of a piezoelectric element 501.

The drive circuit 4 comprises a stepping motor drive IC 401. Excitation signal input terminals 401*a* to 401*d* are used for ON/OFF-controlling the currents to be supplied to A and /A phases, and B and /B phases, and are connected to ports of the CPU 101. A current value setting terminal 401*e* is used for setting the value of the current to be supplied to A and /A phases, and is connected to the DA converter 104. A current value setting terminal 401*f* is used for setting the value of the current to be supplied to B and /B phases, and is connected to a voltage-dividing resistor R. After the output from the piezoelectric element 501 is smoothed by the low-pass filter 102, the output is converted into a digital value by the AD converter 103, and the digital value is supplied to the CPU 101. Note that other arrangements have already been described in the third embodiment above, and a detailed description thereof will be omitted.

The operation will be explained below with reference to the flow chart in FIG. 13.

Upon reception of a drive start instruction of the stepping motor 5*a*, the CPU 101 outputs pre-stored data to the DA converter 104 so as to obtain voltages equal to those applied to the current value setting terminals 401*e* and 401*f* (step S40), and sets a flag at "1" (step S41). Note that the pre-stored data means data corresponding to the individual excitation coils.

The CPU 101 then outputs data having a predetermined pattern to the excitation signal input terminals 401*a* to 401*d* of the stepping motor drive IC 401. This data is kept output during motor driving, although not shown in FIG. 13. The stepping motor drive IC 401 switches the excitation phases on the basis of the input data, and controls the current to obtain the set current value.

Then, the CPU 101 measures the output from the piezoelectric element 501 adhered to the stepping motor 5*a* (step S42), and stores the measured data in the memory 105 (step S43). The CPU 101 increases/decreases the data to be output to the DA converter 104 on the basis of the contents of the flag. For example, if flag=1 (step S44), the CPU increases the data (step S45); if flag=0, it decreases the data (step S46). Note that the data to be output is data corresponding to the individual excitation coils.

The CPU 101 measures the output from the piezoelectric element 501 (step S47), and compares it with the previous measurement value (step S48). As a result, if the output decreases, the CPU does not change the flag contents (step S49); if the output increases, the CPU inverts the flag (step S50). After that, the flow returns to storage of the output, and the series of operations are repeated while the stepping motor 5*a* is driven.

As described above, since the magnitude of the data to be output to the excitation coils of the stepping motor 5*a* is changed on the basis of the vibration measurement result of the piezoelectric element, any torque differences between the excitation coils can be removed, and the motor can be rotated smoothly.

Note that the above-mentioned motor drive control is mainly done by the CPU 101 in the printer controller 1, but may be done by the host computer 8 if necessary modification to the system is made.

As described above, according to the third and fourth embodiments of the present invention, since vibrations of the motor are detected, and the voltages to be applied to the individual excitation coils are controlled on the basis of the comparison result between the detected value and the reference value, an excessive torque can be prevented from being produced, and the motor can be driven efficiently. Such merits suppress excessive power consumption.

According to the third and fourth embodiments of the present invention, since the magnitudes of the voltages to be applied to the excitation coils of the motor are controlled to be varied in units of coils on the basis of the comparison result of the motor vibration detection values, any torque differences between the excitation coils can be removed, and vibrations can be efficiently prevented, thus achieving smooth rotation of the motor.

In the above-mentioned embodiments, the piezoelectric element 501 is attached to the motor case. However, the attached position is not limited to the motor case, and the piezoelectric element 501 may be attached to any other positions such as a motor support member and the like as long as it can detect motor vibrations.

Fifth Embodiment

The fifth embodiment of the present invention will be described below with reference to FIGS. 14 to 18.

Figure 14:
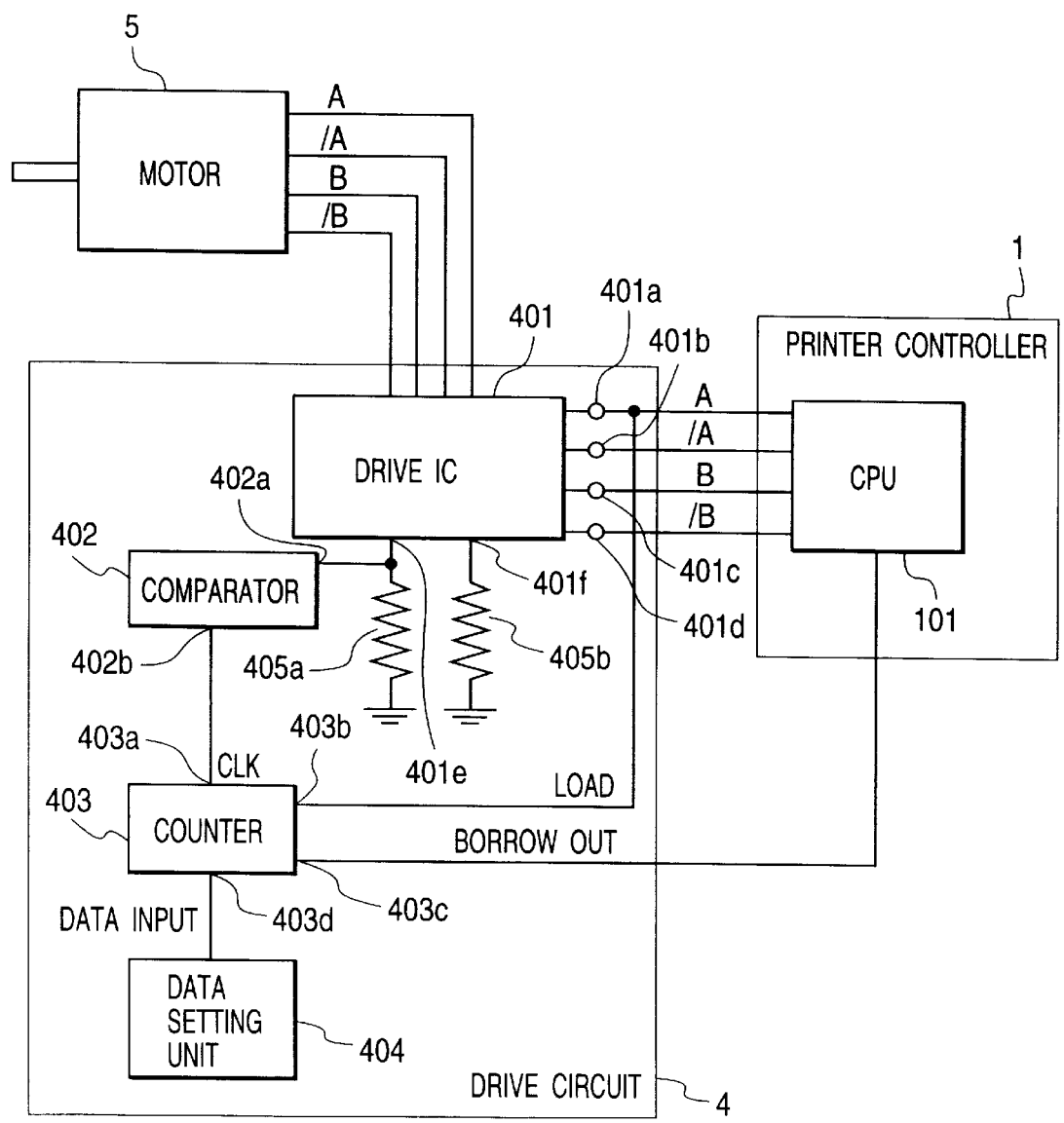
FIG. 14 is a circuit diagram of a drive control circuit for the motor shown in FIG. 1 according to the fifth embodiment of the present invention.

FIG. 14 shows a motor drive control circuit according to the fifth embodiment of the image forming apparatus shown in FIG. 1. In FIG. 14, the printer controller 1 comprises a CPU 101, and the drive circuit 4 comprises a stepping motor drive IC 401. Excitation signal input terminals 401a to 401d are used for ON/OFF-controlling the currents to be supplied to A and /A phases, and B and /B phases, and are connected to ports of the CPU 101. Terminals 401e and 401f are respectively connected to detection resistors 405a and 405b for detecting the values of the currents from the A and /A phases, and B and /B phases. The currents which flow through the motor are converted into voltages by the detection resistors 405a and 405b. A comparator 402 waveshapes the output from the terminal 401f, and outputs it from an output terminal 402b.

A counter 403 has a terminal 403a serving as a clock input terminal, which is connected to the output terminal 402b of the comparator 402. A terminal 403b of the counter 403 serves as a LOAD terminal, which is connected to the terminal 401a (A-phase drive terminal). A terminal 403c of the counter 403 serves as a BORROW OUT terminal, which is connected to the CPU 101. A terminal 403d of the counter 403 is a data input terminal. A data setting unit 404 is connected to the data input terminal 403d, and sets the data to be set in the counter 403.

The operation of the stepping motor used in the image forming apparatus of the present invention will be explained below. Upon reception of a drive start instruction of the stepping motor, the CPU 101 outputs data having a predetermined pattern, which is input to the excitation signal input terminals 401a to 401d of the drive IC 401. This operation continues during motor driving. The drive IC 401 switches the excitation phases on the basis of the input data, and controls the current to obtain the set current value.

Figure 17:
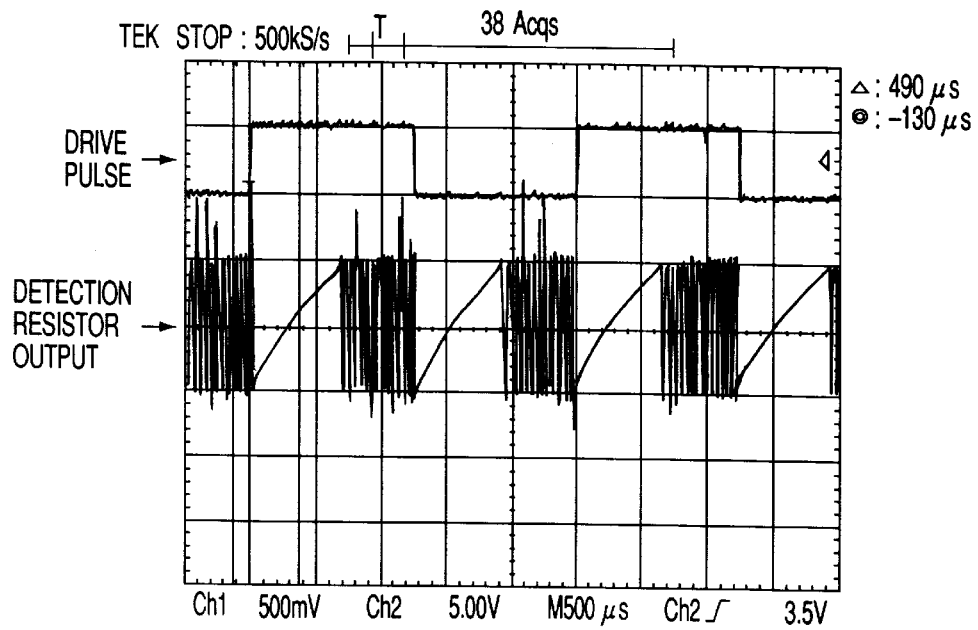
FIG. 17 is an output waveform chart of a detection resistor of the motor drive control circuit shown in FIG. 14 in normal operation.
Figure 18:
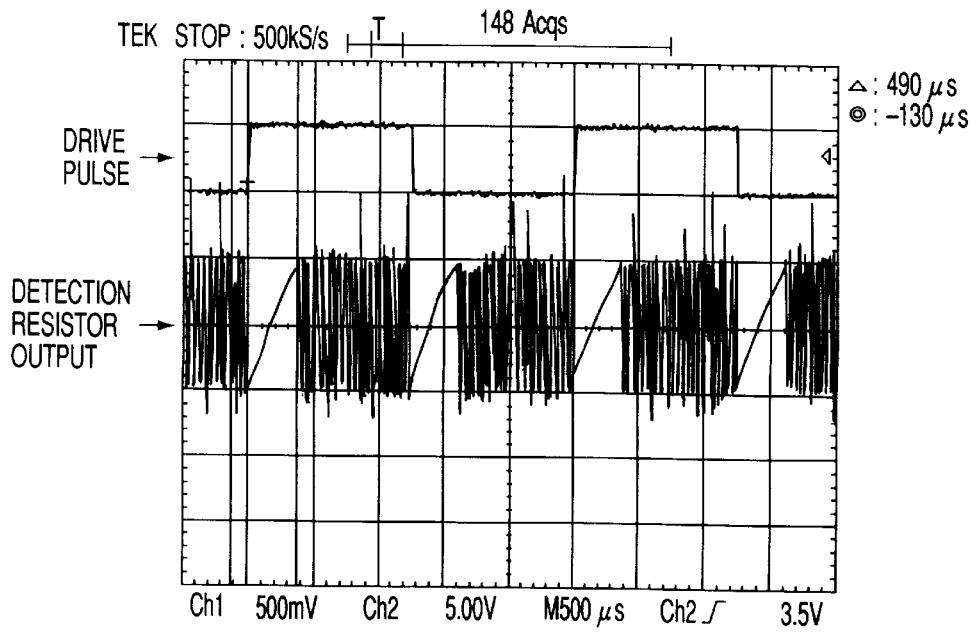
FIG. 18 is an output waveform chart of a detection resistor of the motor drive control circuit shown in FIG. 14 obtained when the motor steps out.

The drive current is controlled in such a manner that the voltage value converted by each detection resistor is compared with a reference voltage that assumes a given value by an internal comparator of the drive IC 401, and the drive current is chopped by an internal chopping circuit of the drive IC 401 on the basis of the comparison result. FIGS. 17 and 18 show examples of the voltage generated by the detection resistor. FIG. 17 shows the waveform obtained when the motor rotates normally, and FIG. 18 shows the waveform obtained when the motor has stepped out. The rise pattern upon supplying a current to the coil is determined by the impedance of the coil and the counter electromotive force produced in the coil. Since the counter electromotive force becomes larger in proportion to the rotational speed, the counter electromotive force obtained in normal rotation is larger than that obtained when the motor steps out, and the current rises slower in normal rotation, as shown in FIGS. 17 and 18. Hence, the number of times of chopping after the target current value has been reached differs between these states. That is, the number of times of chopping in normal rotation is smaller than that obtained when the motor steps out.

Figure 15:
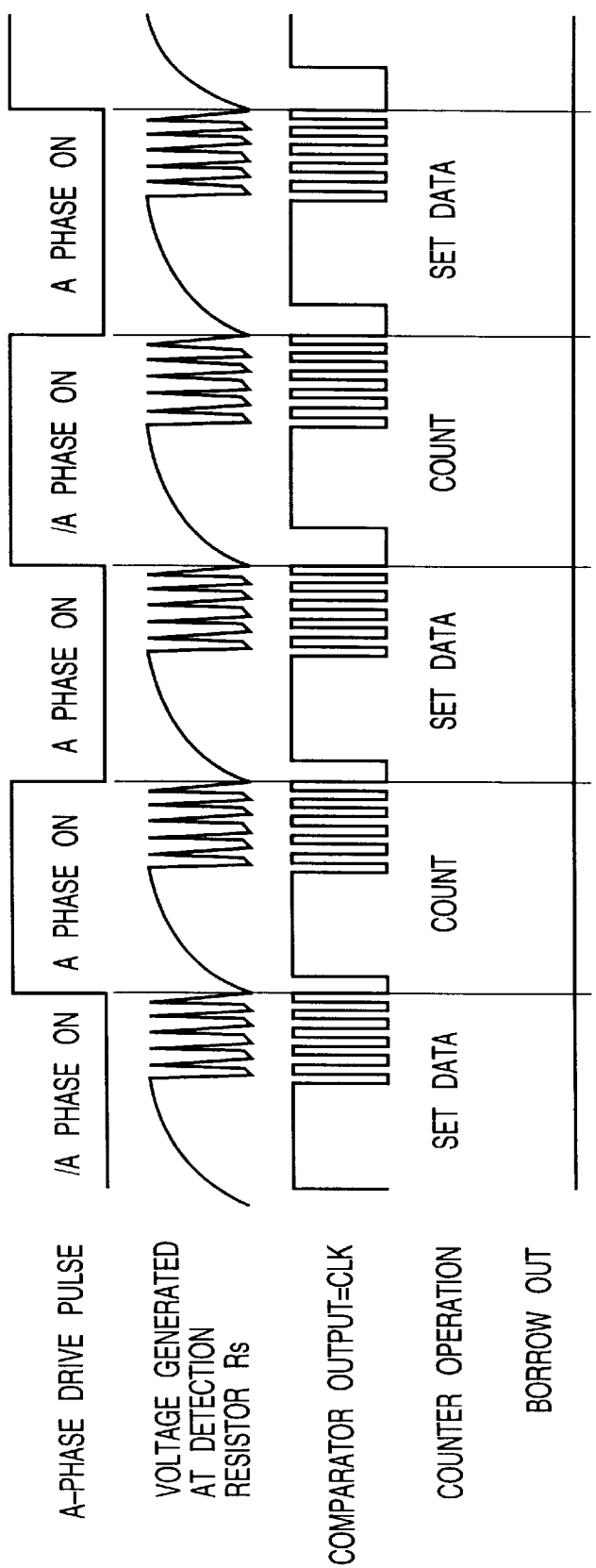
FIG. 15 is a chart showing the waveforms and operation of the respective units of the motor drive control circuit shown in FIG. 14 in normal operation.
Figure 16:
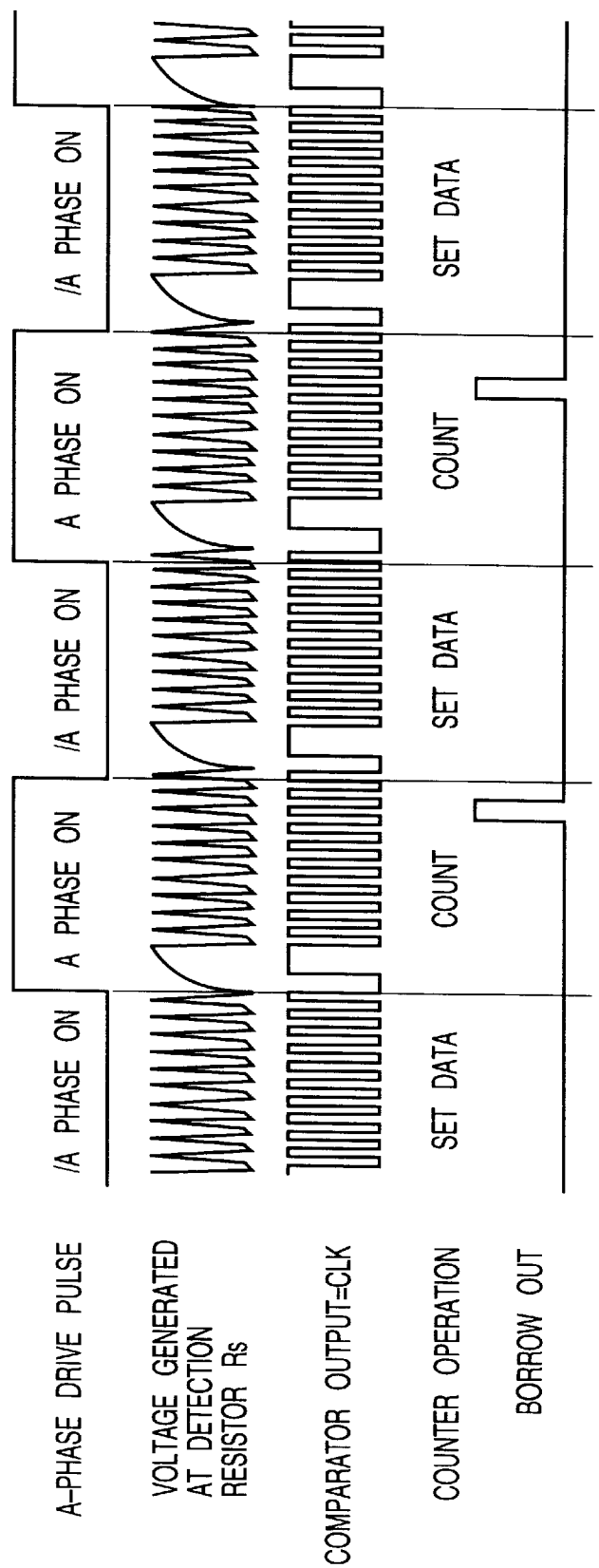
FIG. 16 is a chart showing the waveforms and operation of the respective units of the motor control circuit shown in FIG. 14 obtained when the motor steps out.

The following explanation will be given with the aid of FIGS. 15 and 16. FIG. 15 shows the waveforms and operations of principal portions in normal rotation, and FIG. 16 shows the waveforms and operations of principal portions upon stepping out. Since the LOAD terminal 403b of the counter is connected to the drive pulse (in this embodiment, the A-phase drive terminal 401a), when the drive pulse is at low level (i.e., the /A phase ON), data n set at the data setting unit is loaded into the counter. When the counter is used as a down counter, the data n is pre-set to satisfy the number of times of chopping in normal rotation<n (for the sake of convenience, n=8 in the illustrated embodiment)<the number of times of chopping upon stepping out. In this embodiment, the counter is used as a down counter but may be used as an up counter. Also, data setups and loading may be done by the CPU.

The voltage generated at each detection resistor is waveshaped by the comparator, and the shaped voltage is input to the CLK terminal 403a of the counter. When the LOAD terminal 403b is at high level, i.e., the drive pulse is at high level (that is, the A phase ON), counting is done. Since the final count value (in the illustrated embodiment, 8−6=2) does not become zero in normal rotation, no BORROW OUT is output, as shown in FIG. 15. However, when the motor steps out, since the counter counts down to 8 and the count value becomes zero, a BORROW OUT is output, as shown in FIG. 16. When the CPU monitors the BORROW OUT output, it can detect the stepping out. After detection of the stepping out, the CPU stops driving. The CPU may inform the display or host computer of stepping out of the motor.

Sixth Embodiment

Figure 20:
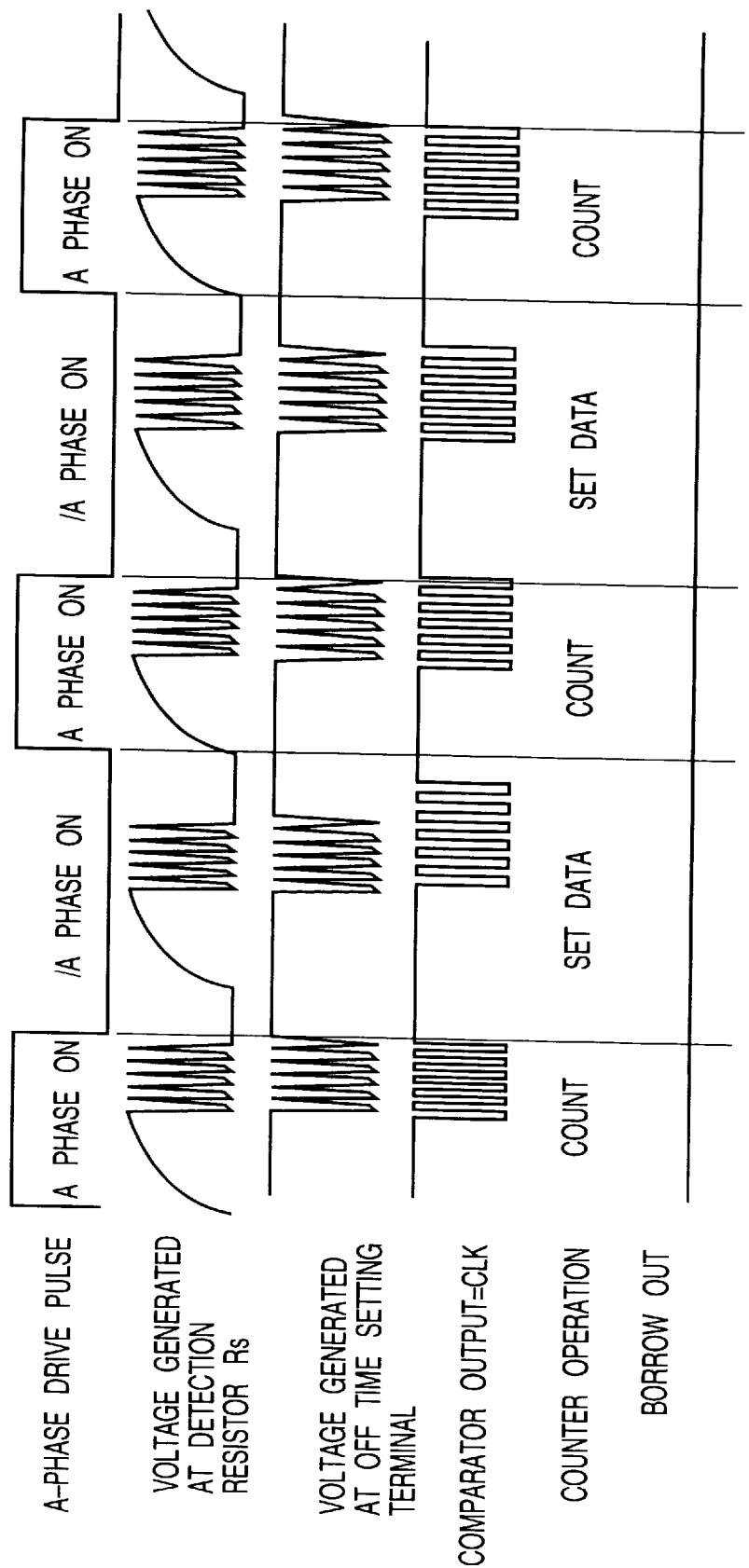
FIG. 20 is a chart showing the waveforms and operation of the respective units of the motor drive control circuit shown in FIG. 19 in normal operation.
Figure 21:
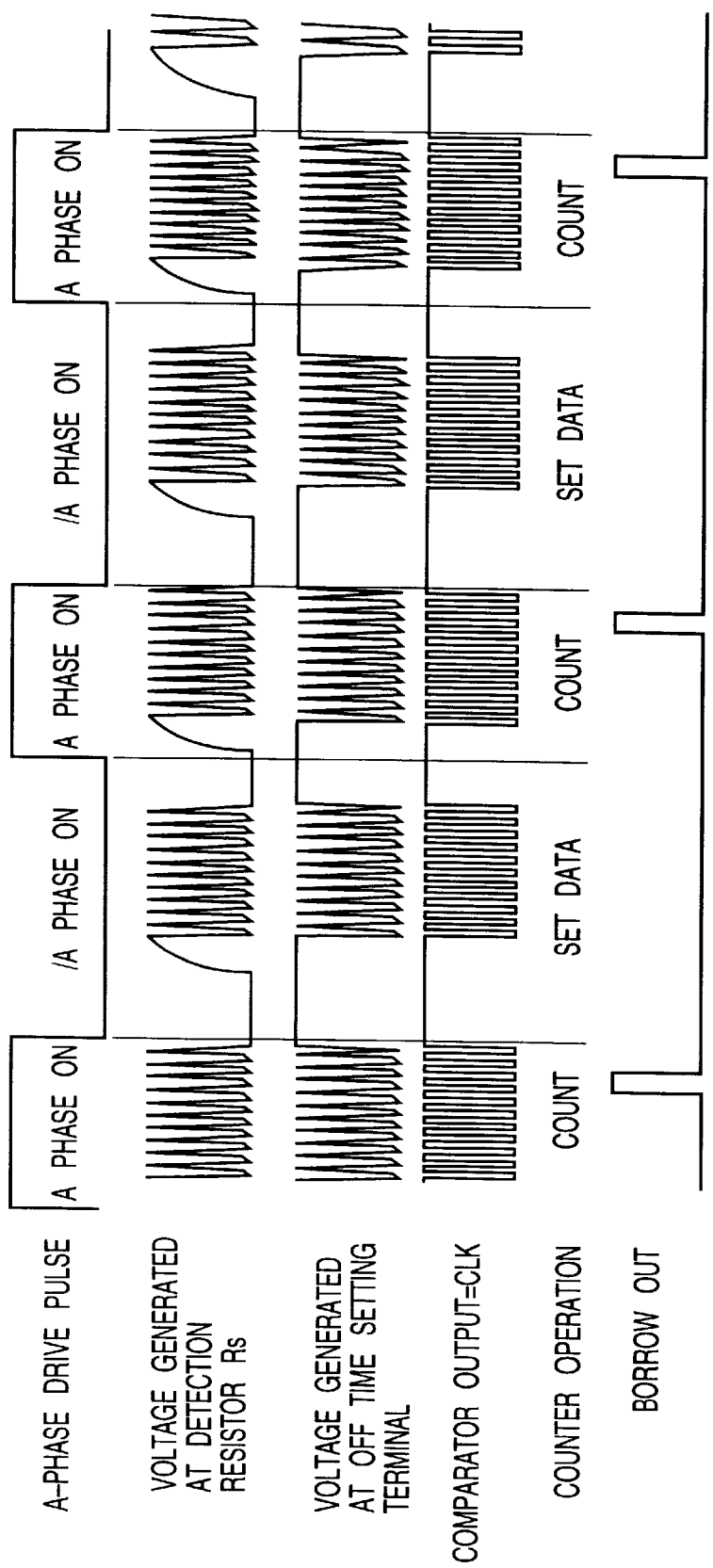
FIG. 21 is a chart showing the waveforms and operation of the respective units of the motor control circuit shown in FIG. 19 obtained when the motor steps out.
Figure 22:
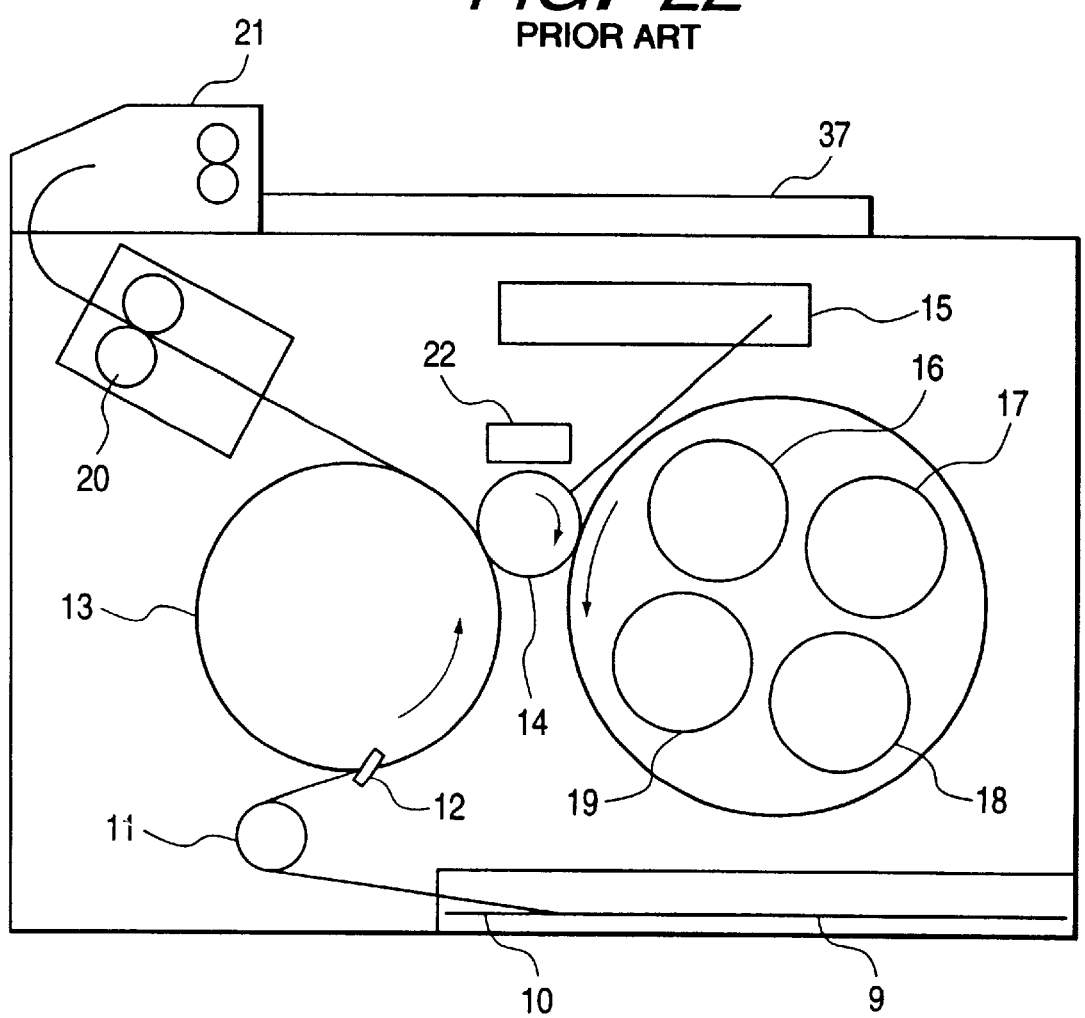
FIG. 22 is a sectional view showing the arrangement of a conventional image forming apparatus having a stepping motor.

The sixth embodiment of the present invention will be described below with reference to FIGS. 19 to 21.

Figure 19:
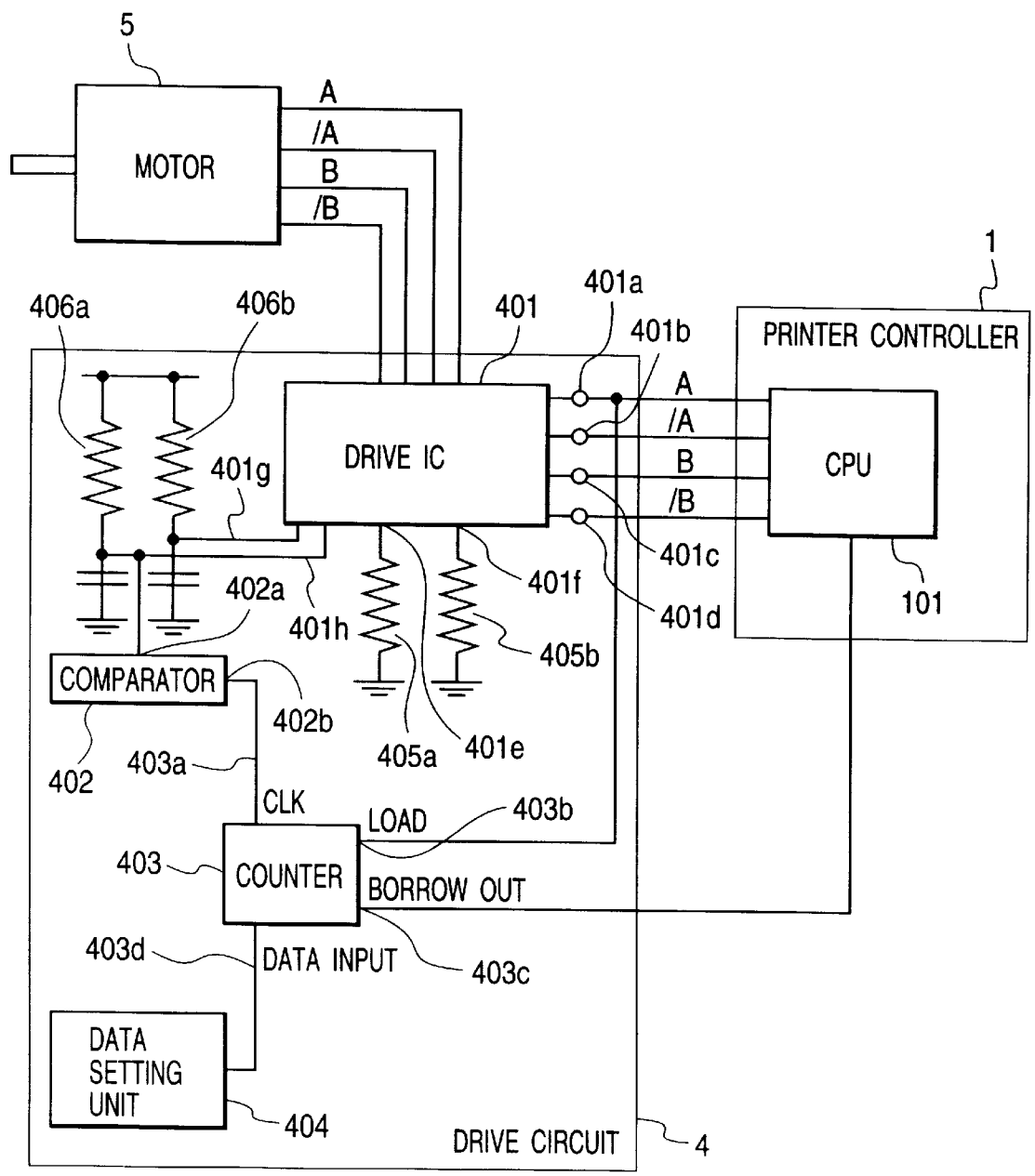
FIG. 19 is a circuit diagram of a drive control circuit for the motor shown in FIG. 1 according to the sixth embodiment of the present invention.

FIG. 19 shows a motor drive control circuit according to the sixth embodiment of the image forming apparatus shown in FIG. 1. In FIG. 19, the printer controller 1 comprises a CPU 101, and the drive circuit 4 comprises a stepping motor drive IC 401. Excitation signal input terminals 401a to 401d are used for ON/OFF-controlling the currents to be supplied to A and /A phases, and B and /B phases, and are connected to ports of the CPU 101. Terminals 401e and 401f are respectively connected to detection resistors 405a and 405b for detecting the values of the currents from the A and /A phases, and B and /B phases. The currents which flow through the motor are converted into voltages by the detection resistors 405a and 405b. A comparator 402 waveshapes the output from a timer 406a and outputs the shaped output from a terminal 402b. Each of the timer 406a and a timer 406b is constituted by a resistor and capacitor to determine the current OFF time upon chopping, and these timers are respectively used for the A and /A phases, and B and /B phases.

A counter 403 has a terminal 403a serving as a clock input terminal, which is connected to the output terminal 402b of the comparator 402. A terminal 403b of the counter 403 serves as a LOAD terminal, which is connected to the terminal 401a (A-phase drive terminal). A terminal 403c of the counter 403 serves as a BORROW OUT terminal, which is connected to the CPU 101. A terminal 403d of the counter 403 is a data input terminal. A data setting unit 404 is connected to the data input terminal 403d, and sets the data to be set in the counter 403.

Driving of the stepping motor and the voltage waveform generated in each detection result are the same as those in the fifth embodiment. The following explanation will be given with the aid of FIGS. 20 and 21. FIG. 20 shows the waveforms and operations of principal portions in normal rotation, and FIG. 21 shows the waveforms and operations of principal portions upon stepping out. Since the LOAD terminal 403b of the counter is connected to the drive pulse (in this embodiment, the A-phase drive terminal 401a), when the drive pulse is at low level (i.e., the /A phase ON), data n set at the data setting unit is loaded into the counter. When the counter is used as a down counter, the data n is pre-set to satisfy the number of times of chopping in normal rotation<n (for the sake of convenience, n=8 in the illustrated embodiment)<the number of times of chopping upon stepping out. In this embodiment, the counter is used as a down counter but may be used as an up counter. Also, data setups and loading may be done by the CPU.

When the voltage generated in the detection resistor has exceeded a given value, i.e., when the drive current has reached the set value, the output from an internal comparator of the drive IC 401 is inverted to cut off the drive current, and the charge on the capacitor of the OFF time setting timer 406a is temporarily discharged. After that, the capacitor is charged via the resistor connected between itself and the power supply, and upon completion of charging, the drive current flows again. Therefore, the outputs from OFF time setting terminals 401g and 401h have waveforms corresponding to chopping. The output from the OFF time setting terminal 401g is waveshaped by the comparator 402, and the shaped output is input to the clock input terminal 403a of the counter 403. When the drive pulse of the counter 403 is at high level (i.e., the A phase ON), counting is done. Since the final count value (in the illustrated embodiment, 8−6=2) does not become zero in normal rotation, no BORROW OUT is output, as shown in FIG. 20. However, when the motor steps out, since the counter counts down to 8 and the count value becomes zero, a BORROW OUT is output, as shown in FIG. 21. When the CPU monitors the BORROW OUT output, it can detect the stepping out. After detection of the stepping out, the CPU stops driving. The CPU may inform the display or host computer of stepping out of the motor.

As described above, according to the fifth and sixth embodiments of the present invention, an image forming apparatus with a motor that can detect stepping out of motor operation can be obtained.

What is claimed is:

1. A motor drive control apparatus comprising:
   a motor which has a plurality of excitation phases, and driving of which is controlled by switching the excitation phases in turn;
   vibration detection means for detecting a vibration of said motor;
   control means for controlling an excitation current that flows through each of coils of the respective excitation phases so as to reduce the detected vibration, wherein said control means comprises comparison means for comparing a vibration detection value detected by said vibration detection means with a reference value and application control means for changing a voltage to be applied to each of the coils of the respective excitation phases until the vibration detection value reaches the reference value.

2. A motor drive control apparatus comprising:
   a motor which has a plurality of excitation phases, and driving of which is controlled by switching the excitation phases in turn;
   vibration detection means for detecting a vibration of said motor;
   control means for controlling an excitation current that flows through each of coils of the respective excitation phases so as to reduce the detected vibration, wherein said control means comprises storage means for storing a vibration detection value detected by said vibration detection means with a reference value, comparison means for comparing the stored vibration detection value with a newly detected vibration detection value and application control means for applying different voltages in units of coils of the respective excitation phases in accordance with the comparison result.

3. A motor drive control method for controlling driving of a motor by switching a plurality of excitation phases of the motor in turn, comprising the steps of:
   detecting a vibration of the motor by vibration detection means;
   comparing a detected vibration detection value with a reference value; and
   changing a voltage to be applied to each of coils of the respective excitation phases until the vibration detection value reaches the reference value,
   whereby an excitation current that flows through each of coils of the respective excitation phases is controlled to reduce the detected vibration.

4. A motor drive control method for controlling driving of a motor by switching a plurality of excitation phases of the motor in turn, comprising the steps of:
   detecting a vibration of the motor by vibration detection means;
   storing a detected vibration of the motor by vibration detection means;
   storing a detected vibration detection value in storage means;
   comparing the stored vibration detection value with a newly detected vibration detection value; and
   applying different voltages in units of coils of the respective excitation phases in accordance with the comparison result,
   whereby an excitation current that flows through each of coils of the respective excitation phases is controlled to reduce the detected vibration.

5. A method according to claim 3 or 4, wherein said vibration detection means comprises a piezoelectric element.

6. A method of controlling a stepping motor used in an image forming apparatus having drive current detection means for detecting a drive current for each of excitation phases of the stepping motor and generating an output corresponding to the drive current, drive current supply means for supplying the drive current while switching the excitation phases in turn, and optimal output value setting means for setting a value corresponding to a desired current value common to the respective excitation phases of the current supplied from said drive current supply means in correspondence with the outputs from said drive current detection means, comprising, in units of excitation phases, the steps of:
   comparing an average value of a predetermined number of past outputs generated by said drive current detection means with an output value set by said optimal output value setting means;
   increasing the drive current when the average value is larger than the output value as a result of comparison, increasing the drive current when the average value is smaller than the output value, and maintaining the drive current when the average and output values are equal to each other;
   supplying the drive current with the increased or decreased value or the maintained value to the corresponding excitation phase;

measuring an output generated by said drive current detection means when the drive current is supplied to the excitation phase;

updating the average value using the measurement result;

storing the drive current supplied to the excitation phase; and repeating the above steps.

7. A method for controlling a stepping motor used in an image forming apparatus having drive current detection means for detecting a drive current for each of excitation phases of the stepping motor and generating an output corresponding to the drive current, drive current supply means for supplying the drive current while switching the excitation phases in turn, and optimal output value setting means for setting a value corresponding to a desired current value common to the respective excitation phases of the current supplied from said drive current supply means in correspondence with the outputs from said drive current detection means, comprising, in units of excitation phases, the steps of:

comparing an average value of a predetermined number of past outputs generated by said drive current detection means with an output value set by said optimal output value setting means;

decreasing an ON time of the drive current when the average value is larger than the output value as a result of comparison, increasing the ON time of the drive current when the average value is smaller than the output value, and maintaining the ON time of the drive current when the average and output values are equal to each other;

supplying the drive current to the corresponding excitation phase to have the increased or decreased ON time or the maintained ON time;

measuring an output generated by said drive current detection means when the drive current is supplied to the excitation phase;

updating the average value using the measurement result;

storing the ON time of the drive current supplied to the excitation phase; and repeating the above steps.

8. An image forming apparatus using a stepping motor as a power source, comprising:

a stepping motor;

drive means for supplying a drive pulse for driving said stepping motor by constant current chopper control;

a CPU for supplying a signal for switching excitation phases in turn to said drive means so as to make said drive means generated the drive pulse;

detection means for detecting the number of times of chopping by the constant current chopper control by said drive means; and stepping out determination means for determining on the basis of the number of time of chopping detected by said detection means, and the number of times of chopping when the motor operation performs a step out operation, whether or not said stepping motor has stepped out.

9. An apparatus according to claim 8, further comprising OFF time setting means, inserted between said detection means and said stepping out detection means, for setting a current OFF time of chopping operation.

10. An apparatus according to claim 9, wherein said detection means has a detection resistor for detecting the presence/absence of current flow in the drive pulse, and said stepping out determination means comprises:

a data setting unit for setting a reference value which is larger than the number of times of chopping when the motor operation is normal and is smaller than the number of times of chopping when the motor operation performs a step out operation;

a counter for loading the reference value set by said data setting unit when one of ON and OFF signals of one excitation phase is input from said CPU, receiving the presence/absence of current flow detected by said detection resistor as a pulse and counting the number of pulses when either the ON or OFF signals of one excitation phase is input from said CPU, and outputting a stepping out detection signal when the number of pulses has reached the reference value.

11. An apparatus according to claim 10, wherein said detection means further comprises conversion means for extracting the presence/absence of current flow detected by said detection resistor as a voltage value, and a comparator for waveshaping the voltage value extracted by said conversion means and outputting the shaped voltage value as a pulse to said counter.

* * * * *

UNITED STATES PATENT AND TRADEMARK OFFICE
CERTIFICATE OF CORRECTION

PATENT NO. : 6,140,792

DATED : October 31, 2000

INVENTORS : Shigeru Kameyama, et al.

It is certified that error appears in the above-identified patent and that said Letters Patent is hereby corrected as shown below:

COLUMN 4

Line 18, "this" should read --these--.

COLUMN 5

Line 40, "this" should read --these--.

COLUMN 14

Line 5, "generated" should read --generate--; and
Line 11, "time" should read --times--.

Signed and Sealed this

First Day of May, 2001

Attest:

NICHOLAS P. GODICI

*Attesting Officer*        *Acting Director of the United States Patent and Trademark Office*